(12) United States Patent
Shah et al.

(10) Patent No.: US 12,371,620 B2
(45) Date of Patent: Jul. 29, 2025

(54) METHOD AND SYSTEM FOR PYROLYSIS AND CARBON DEPOSITION

(71) Applicant: ROYAL MELBOURNE INSTITUTE OF TECHNOLOGY, Victoria (AU)

(72) Inventors: Kalpit Shah, Victoria (AU); Kumar Sazal Kundu, Victoria (AU); Rajnikantbhai Savankumar Patel, Victoria (AU); David John Winter, New South Wales (AU)

(73) Assignee: ROYAL MELBOURNE INSTITUTE OF TECHNOLOGY, Victoria (AU)

( * ) Notice: Subject to any disclaimer, the term of this patent is extended or adjusted under 35 U.S.C. 154(b) by 0 days.

(21) Appl. No.: 17/778,988

(22) PCT Filed: Nov. 27, 2020

(86) PCT No.: PCT/AU2020/051289
§ 371 (c)(1),
(2) Date: May 23, 2022

(87) PCT Pub. No.: WO2021/102521
PCT Pub. Date: Jun. 3, 2021

(65) Prior Publication Data
US 2023/0348788 A1  Nov. 2, 2023

(30) Foreign Application Priority Data
Nov. 29, 2019  (AU) .................... 2019904509

(51) Int. Cl.
*C01B 3/26* (2006.01)
*B01J 8/18* (2006.01)
(Continued)

(52) U.S. Cl.
CPC ............ *C10B 57/005* (2013.01); *B01J 8/1827* (2013.01); *B01J 8/24* (2013.01); *C01B 3/26* (2013.01);
(Continued)

(58) Field of Classification Search
CPC ........ C10B 57/005; C10B 53/00; C10B 57/06; C10B 53/07; C10B 57/02; C10B 47/24;
(Continued)

(56) References Cited

U.S. PATENT DOCUMENTS 2,224,823 A * 12/1940 Klein .................. C10B 1/04
201/34
2002/0007594 A1  1/2002 Muradov et al.
(Continued)

FOREIGN PATENT DOCUMENTS

CN      102388119 A    3/2012
CN      108328573 A    7/2018
(Continued)

OTHER PUBLICATIONS

International Search Report dated Dec. 22, 2020, in connection with PCT International Application No. PCT/AU2020/051289.
(Continued)

*Primary Examiner* — Renee Robinson
(74) *Attorney, Agent, or Firm* — Norris McLaughlin, PA

(57) ABSTRACT

The invention provides a method of sequential pyrolysis and carbon deposition to produce a composite carbonaceous product, the method comprising: a pyrolysis process step comprising pyrolyzing a pyrolyzable organic feed at a pyrolysis temperature in a first reaction zone in the presence of a non-oxidising gas to produce hot char and pyrolysis gas, wherein the pyrolysis gas and the non-oxidising gas combine to form a gas mixture; discharging the gas mixture from the first reaction zone to a combustion zone and combusting
(Continued)

at least a portion of the pyrolysis gas therein, wherein heat produced by the combusting of the pyrolysis gas is transmitted from the combustion zone to the first reaction zone to provide at least a portion of the heat of pyrolysis; and a decomposition process step comprising contacting a hydrocarbon-rich organic gas with the hot char directly after its production in the pyrolysis process step, wherein the hydrocarbon-rich organic gas catalytically decomposes on the hot char at a decomposition temperature which is higher than the pyrolysis temperature, thereby producing gaseous decomposition products comprising hydrogen and a composite carbonaceous material comprising the char with carbon deposits thereon.

18 Claims, 10 Drawing Sheets

(51) Int. Cl.
| | |
|---|---|
| *B01J 8/24* | (2006.01) |
| *C02F 11/10* | (2006.01) |
| *C10B 53/00* | (2006.01) |
| *C10B 53/07* | (2006.01) |
| *C10B 57/00* | (2006.01) |
| *C10B 57/06* | (2006.01) |
| *F23G 5/027* | (2006.01) |

(52) U.S. Cl.
CPC .............. *C02F 11/10* (2013.01); *C10B 53/00* (2013.01); *C10B 53/07* (2013.01); *C10B 57/06* (2013.01); *F23G 5/027* (2013.01); *C01B 2203/0277* (2013.01); *C01B 2203/06* (2013.01); *F23G 2201/302* (2013.01); *F23G 2201/303* (2013.01); *F23G 2206/10* (2013.01); *F23G 2209/26* (2013.01)

(58) Field of Classification Search
CPC .... C02F 11/10; F23G 5/027; F23G 2201/302; F23G 2201/303; F23G 2206/10; F23G 5/0273; F23G 2209/26; C01B 3/24–26; C01B 2203/0277; C01B 2203/06
See application file for complete search history.

(56) References Cited

U.S. PATENT DOCUMENTS

| | | | |
|---|---|---|---|
| 2007/0012232 A1 | 1/2007 | Skrypski-Mantele et al. | |
| 2010/0326087 A1 | 12/2010 | Kawase et al. | |
| 2011/0120138 A1* | 5/2011 | Gaiffi ..................... | C10K 1/003 |
| | | | 429/426 |
| 2012/0066974 A1 | 3/2012 | Jorgensen et al. | |
| 2014/0101992 A1* | 4/2014 | Mennell .................. | C10B 39/00 |
| | | | 44/629 |
| 2014/0127121 A1 | 5/2014 | Mass et al. | |
| 2018/0065106 A1 | 3/2018 | Despen et al. | |

FOREIGN PATENT DOCUMENTS

| | | |
|---|---|---|
| JP | 2002241762 A | 8/2002 |
| WO | 2010/110470 A1 | 9/2010 |
| WO | 2012/142489 A1 | 10/2012 |
| WO | 2019/104382 A1 | 6/2019 |
| WO | 2019/227162 A1 | 12/2019 |

OTHER PUBLICATIONS

Australian International-Type Search Report dated Oct. 20, 2020, in connection with Australian Application No. 2019904509.
Written Opinion dated Dec. 22, 2020, in connection with PCT International Application No. PCT/AU2020/051289.
European Search report for corresponding application EP 20893309.3 dated Nov. 24, 2023.
Patel Savankumar, et al: "Slow pyrolysis of biosolids in a bubbling fluidised bed reactor using biochar, activated char and lime", Journal of Analytical and Applied Pyrolysis, Elsevier BV, NL, vol. 144, Sep. 28, 2019, pp. 1-11.
Supplemental European Search report for corresponding application EP 20893309 dated Nov. 7, 2023.
CN Office Action and English translation for corresponding application CN 2020800935506 dated Jan. 25, 2024.

* cited by examiner

METHOD AND SYSTEM FOR PYROLYSIS AND CARBON DEPOSITION

This is an application filed under 35 USC 371 based on PCT/AU2020/051289, filed 27 Nov. 2020, which claimed priority to AU 3019904509 filed 29 Nov. 2019. The present application claims the full priority benefit of all prior applications and incorporates by reference their full disclosures as if set forth herein.

TECHNICAL FIELD

The invention relates to a method and system for sequential pyrolysis and carbon deposition to produce a composite carbonaceous product. The method includes pyrolyzing an organic feed to produce hot char and pyrolysis gas, combusting the pyrolysis gas and transmitting heat from the combustion to provide at least a portion of the heat of pyrolysis, and catalytically decomposing a hydrocarbon-rich organic gas on the hot char directly after its production at a temperature higher than the pyrolysis temperature. A composite carbonaceous material comprising the char with carbon deposits thereon is thus produced.

BACKGROUND OF INVENTION

Carbon emissions are of increasing concern in many industrial processes, including in processes which seek to remediate or monetise biomass or carbon-containing waste feedstocks. Gasification and incineration have been proposed as thermal methods to process such feedstocks, yet almost all the carbon is ultimately emitted as carbon dioxide.

Another approach, which can advantageously retain a proportion of the feedstock carbon in a stable solid product, is pyrolysis. Pyrolysis is a high temperature decomposition process for converting a pyrolyzable organic feed (i.e. any feed containing at least a portion of organic, carbon-based material) under non-oxidising conditions, in particular where the oxygen content is sufficiently low that endothermic cracking reactions predominate over exothermic oxidation reactions. The industrial pyrolysis normally operates at medium to high temperatures (350-900° C.) to produce products for energy, fuel or chemical applications. Pyrolysis produces three product streams: a solid carbonaceous product (char), a condensable pyrolysis oil fraction and a non-condensable gas fraction.

Pyrolysis is considered particularly useful for the processing of potentially contaminated waste or biomass streams, including biosolids which is a product of waste water treatment plants. The high temperature pyrolysis advantageously sterilises potentially harmful microorganisms in the feedstock as well as permanently sequestrating a portion of the carbon in the (bio)char product. However, other carbon-containing streams which are often co-generated with solid feedstocks, including biogas, are typically combusted.

Pyrolysis products can be converted to useful derivatives or can be used in their original form for a number of applications. For example, the char can be used for soil amendment, soil remediation, water purification, composites or as fuel. However, given the cost of operating processes for remediating or utilising low value waste feedstocks, there is a need to increase the value of the product slate, and in particular the solid pyrolysis products.

In pyrolysis processes where char is the primary product of interest, the oil and/or gas fractions may be combusted to provide the energy needed to drive the endothermic pyrolysis reaction. Excess energy may be used to generate electrical power or utility steam. A further issue in such pyrolysis systems is that heat transfer between combustion and pyrolysis may be unsatisfactory, resulting in poor heat distribution and thus low rates of pyrolysis and/or poor or inconsistent quality of char products. Moreover, improvements in the overall energy balance of pyrolysis systems remain desirable.

Chemical vapour deposition (CVD) is another approach to carbon sequestration, in this case by carbon deposition in the form of carbon nanomaterials. Gaseous hydrocarbon vapours are passed over a catalyst to produce the carbon nanomaterials together with a hydrogen-rich decomposition gas product. Synthetic catalysts including catalytic metals such as Ni, Fe and Co have been reported for this process. However, such catalysts are susceptible to deactivation and, since they are expensive, must be regenerated. They also leave metal impurities in the carbon nanomaterials.

Lower cost carbon-based catalysts such as activated carbon, graphite and carbon black have thus been proposed as alternatives to metal catalysts. However, conversions obtained with carbon-based catalysts are relatively low compared to synthetic catalysts. Moreover, carbon-based catalysts are either purchased or produced from specialised feedstocks in a separate process before use in CVD. The cost of producing carbon-based catalysts with adequate performance is thus still a limiting factor in the implementation of large-scale CVD processes.

Pyrolysis processes have been reported where an increased total carbon recovery is obtained by re-adsorbing and dehydrogenating pyrolysis vapours on the char pyrolysis products, either simultaneously with the pyrolytic reactions occurring in the pyrolysis reaction zone or separately in a downstream process unit. However, at typical pyrolysis temperatures where these dehydrogenation reactions occur, pore-blocking amorphous coke deposits are formed on the char rather than value-added carbon materials such as carbon nanomaterials.

There is therefore an ongoing need for new methods and systems for pyrolysis and carbon deposition which at least partially address one or more of the above-mentioned shortcomings or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides a method of sequential pyrolysis and carbon deposition to produce a composite carbonaceous product, the method comprising: a pyrolysis process step comprising pyrolyzing a pyrolyzable organic feed at a pyrolysis temperature in a first reaction zone in the presence of a non-oxidising gas to produce hot char and pyrolysis gas, wherein the pyrolysis gas and the non-oxidising gas combine to form a gas mixture; discharging the gas mixture from the first reaction zone to a combustion zone and combusting at least a portion of the pyrolysis gas therein, wherein heat produced by the combusting of the pyrolysis gas is transmitted from the combustion zone to the first reaction zone to provide at least a portion of the heat of pyrolysis; and a decomposition process step comprising contacting a hydrocarbon-rich organic gas with the hot char directly after its production in the pyrolysis process step, wherein the hydrocarbon-rich organic gas catalytically decomposes on the hot char at a decomposition temperature which is higher than the pyrolysis temperature, thereby producing gaseous decomposition products comprising hydrogen and a composite carbonaceous material comprising the char with carbon deposits thereon.

Advantageously the integrated mode of sequential pyrolysis and carbon deposition process steps may provide a high degree of sequestration of overall carbon from both carbon-containing feeds, in a stable and potentially useful composite carbonaceous product. The immediate use of the as-formed hot char pyrolysis product as catalyst for carbon deposition may provide improved catalytic performance compared to ostensibly similar pre-produced materials, since cooling-induced degradation mechanisms are minimised. Moreover, a high degree of thermal efficiency can be obtained since the intermediate char product, already containing process heat, is used as the catalytic substrate for high temperature carbon deposition. The elevation of the temperature between the pyrolysis and decomposition process steps facilitates the formation of high-quality crystalline carbon materials, including carbon nanomaterials. The combustion of pyrolysis gas, and optionally also the decomposition gas, is used to provide the heat needed for endothermic reaction.

In some embodiments, the method further comprises separating a gas composition comprising the gaseous decomposition products and any residual hydrocarbon-rich organic gas from the composite carbonaceous material and combusting at least a portion of the combustible components therein, wherein heat produced by the combusting of the combustible components is transmitted to provide at least a portion of the heat of decomposition.

In some embodiments, the pyrolyzable organic feed comprises biomass, such as biosolids.

In some embodiments, the hot char remains continuously at temperatures of above 300° C., or above 400° C., or above 600° C., or above 700° C., between its production in the pyrolysis process step and the catalytic decomposing of the hydrocarbon-rich organic gas thereon in the decomposition process step.

In some embodiments, the pyrolyzing in the pyrolysis process step and the catalytic decomposing in the decomposition process step are conducted sequentially in the first reaction zone. The catalytic decomposing may be initiated by introducing the hydrocarbon-rich organic gas to the first reaction zone. A flow of the non-oxidising gas to the first reaction zone may be reduced or ceased when a flow of the hydrocarbon-rich organic gas is introduced. Solids in the first reaction zone may be continuously fluidised during the pyrolyzing and the catalytic decomposing in a fluidising stream comprising the non-oxidising gas and/or the hydrocarbon-rich organic gas.

In some embodiments, the first reaction zone is separated from the combustion zone by a heat-transmissive partition, wherein the heat transmitted from the combustion zone to the first reaction zone to provide at least a portion of the heat of pyrolysis is transmitted through the heat-transmissive partition. The heat-transmissive partition may comprise a plurality of apertures, wherein the gas mixture flows from the first reaction zone to the combustion zone via the apertures.

In some such embodiments, the catalytic decomposing in the decomposition process step is conducted in the first reaction zone and a gas composition comprising the gaseous decomposition products and any residual hydrocarbon-rich organic gas is discharged to the combustion zone for combustion of combustible components therein, wherein heat produced by the combusting of the combustible components is transmitted through the heat transmissive partition to provide at least a portion of the heat of decomposition.

In some embodiments, the hydrocarbon-rich organic gas is substantially free of the pyrolysis gas, or components thereof, produced in the pyrolysis process step. All or substantially all (e.g. greater than 90%) of the hydrocarbon-rich organic gas may thus be provided from a source external to the pyrolysis process step where the hot char is produced. In some embodiments, the hydrocarbon-rich organic gas is selected from biogas and a plastic pyrolysis gas.

In some embodiments, the method further comprises: pyrolyzing a polymer to produce a hot pyrolysis vapour, wherein the hot pyrolysis vapour forms at least a portion of the hydrocarbon-rich organic gas; separating a gas composition comprising the gaseous decomposition products and any residual hydrocarbon-rich organic gas from the composite carbonaceous material; and cooling the gas composition to condense a pyrolysis oil fraction.

In some embodiments, the method further comprises discharging a portion of the gas mixture from the first reaction zone, wherein the pyrolysis gas therein forms at least a portion of the hydrocarbon-rich organic gas.

In some embodiments, the decomposition temperature is at least 700° C., or at least 750° C., or at least 800° C., such as at least 850° C. In some embodiments, the decomposition temperature is no more than 200° C. higher, or no more than 100° C. higher, than the pyrolysis temperature.

In some embodiments, the method further comprises introducing an activation additive to the first reaction zone before or during the pyrolyzing, wherein the activation additive causes an increase in a surface area of the hot char relative to hot char produced in the absence of the additive. The activation additive may be selected from the group consisting of NaOH and KOH.

In some embodiments, the composite carbonaceous material comprises at least 5 wt % of the carbon deposits, or at least 10 wt % of the carbon deposits, or at least 20 wt % of the carbon deposits.

In some embodiments, the carbon deposits are crystalline. In some embodiments, the carbon deposits comprise carbon nanomaterials, for example selected from carbon nanotubes, carbon nanofibres and carbon nanospheres.

In some embodiments, at least 30%, or at least 40% of the total carbon in the pyrolyzable organic feed and the hydrocarbon-rich organic gas is sequestered in the composite carbonaceous material.

In some embodiments, the method comprises separating and recovering at least a portion of the hydrogen. Such a method may comprise separating a gas composition comprising the gaseous decomposition products and any residual hydrocarbon-rich organic gas from the composite carbonaceous material and separating hydrogen from the gas composition.

In some embodiments, the method further comprises generating electrical energy and/or steam from heat produced by combustion of the pyrolysis gas and/or combustible components in a gas composition comprising the gaseous decomposition products and any residual hydrocarbon-rich organic gas.

In accordance with a second aspect the invention provides a system for sequential pyrolysis and carbon deposition to produce a composite carbonaceous product, the system comprising: (i) a first endothermic reactor comprising a first reaction zone, a first gas inlet and one or more first gas outlets, wherein the first endothermic reactor is configured for a pyrolysis process step comprising: feeding a non-oxidising gas to the first reaction zone via the first gas inlet; pyrolyzing a pyrolyzable organic feed at a pyrolysis temperature in the first reaction zone in the presence of the non-oxidising gas to produce hot char and pyrolysis gas, wherein the pyrolysis gas and the non-oxidising gas combine to form a gas mixture; and discharging the gas mixture from the first reaction zone via the first gas outlets, and (ii) a combustor comprising a combustion zone, wherein the combustor is configured to: receive the gas mixture discharged from the first reaction zone in the combustion zone; feed an oxygen-containing gas to the combustion zone; and combust at least a portion of the pyrolysis gas in the combustion zone, wherein heat produced by the combusting of the pyrolysis gas is transmitted from the combustion zone to the first reaction zone to provide at least a portion of the heat of pyrolysis, wherein either: (iii) the first endothermic reactor is further configured for a decomposition process step comprising: introducing a feed of a hydrocarbon-rich organic gas to the first reaction zone via the first gas inlet or another gas inlet directly after producing the hot char therein in the pyrolysis process step; and catalytically decomposing the hydrocarbon-rich organic gas on the hot char in the first reaction zone at a decomposition temperature which is higher than the pyrolysis temperature, thereby producing gaseous decomposition products comprising hydrogen and a composite carbonaceous material comprising the char with carbon deposits thereon, or: (iv) the system further comprises a second reaction zone and a second gas inlet, wherein the second reaction zone is configured for a decomposition process step comprising: receiving the hot char from the first reaction zone in the second reaction zone directly after producing the hot char in the pyrolysis process step; introducing a feed of a hydrocarbon-rich organic gas to the second reaction zone via the second gas inlet; and catalytically decomposing the hydrocarbon-rich organic gas on the hot char in the second reaction zone at a decomposition temperature which is higher than the pyrolysis temperature, thereby producing gaseous decomposition products comprising hydrogen and a composite carbonaceous material comprising the char with carbon deposits thereon.

In some embodiments, option (iii) applies.

In some embodiments, the first endothermic reactor is configured to fluidise solids in the first reaction zone during the pyrolyzing. In some embodiments, the first endothermic reactor is configured to continuously fluidise solids in the first reaction zone during the pyrolyzing and the catalytic decomposing in a fluidising stream comprising the non-oxidising gas and/or the hydrocarbon-rich organic gas. The system may comprise one or more heat exchange conduits configured to carry combustion product gas from the combustion zone through the first reaction zone, thereby heating the fluidised solids in use.

In some embodiments, the first reaction zone is separated from the combustion zone by a heat-transmissive partition, wherein heat is transmittable from the combustion zone to the first reaction zone through the heat-transmissive partition. The heat-transmissive partition may comprise a plurality of apertures to allow the gas mixture to flow from the first reaction zone to the combustion zone via the apertures.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

The present invention relates to a method of sequential pyrolysis and carbon deposition to produce a composite carbonaceous product. The method comprises a pyrolysis process step comprising pyrolyzing a pyrolyzable organic feed in a first reaction zone in the presence of a non-oxidising gas to produce hot char and pyrolysis gas. The pyrolysis gas and the non-oxidising gas combine to form a gas mixture, some or all of which is discharged from the first reaction zone to a combustion zone. At least a portion of the pyrolysis gas is combusted in the combustion zone, and heat produced by the combusting is transmitted from the combustion zone to the first reaction zone to provide at least a portion of the heat of pyrolysis. The method further comprises a decomposition process step comprising contacting a hydrocarbon-rich organic gas with the hot char directly after its production in the pyrolysis process step. The hydrocarbon-rich organic gas is catalytically decomposed on the hot char at a decomposition temperature which is higher than the pyrolysis temperature, thereby producing gaseous decomposition products comprising hydrogen and a composite carbonaceous material comprising the char with carbon deposits thereon.

Figure 1:
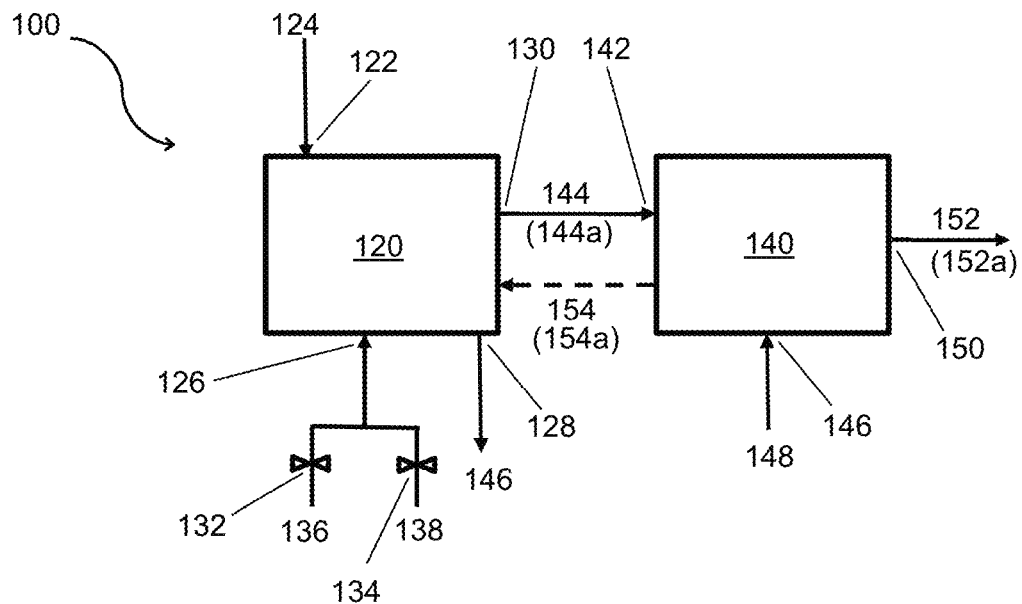
FIG. 1 schematically depicts a system for sequential pyrolysis and carbon deposition in the same reaction zone, according to embodiments of the invention.

Depicted in FIG. 1 is system 100 according to embodiments of the invention. System 100 comprises a reaction vessel having first reaction zone 120, feed inlet 122 for introducing organic pyrolyzable feed 124, gas inlet 126, solid product outlet 128 and one or more gas outlets 130. Gas inlet 126 is supplied by a gas manifold including valves 132 and 134 which control the flow of non-oxidising gas 136 and hydrocarbon-rich organic gas 138 respectively. Alternatively, valves 132 and 134 may control the addition of gases 136 and 138 to the first reaction zone via separate gas inlets. In some embodiments, reaction zone 120 is configured for fluidisation of solids in the gas flow introduced via inlet 126.

System 100 further comprises combustion zone 140, which may be a separate reaction zone within the same reaction vessel as first reaction zone 120 or in a different reaction vessel. Combustion zone 140 is provided with one or more feed gas inlets 142 for feeding gas mixture 144 discharged from first reaction zone 120, oxidation gas inlet 146 for introducing oxygen-containing gas 148 and combustion gas outlet 150 for discharging combustion product gas 152.

Combustion zone 140 and first reaction zone 120 are thermally integrated, such that heat 154 produced by exothermic combustion reactions in combustion zone 140 can be transmitted to first reaction zone 120 to drive endothermic reactions therein. This may be done in a variety of ways, including using heat exchangers to preheat the feed gases to first reaction zone 120 or by using a heat-transmissive partition between reaction zones 120 and combustion zone 140, as will be described in greater detail hereafter.

In use, non-oxidising gas 136, for example nitrogen, is fed to first reaction zone 120 by opening valve 132 while keeping valve 134 closed. Pyrolyzable organic feed 124, for example biosolids in particulate form, is fed to first reaction zone 124 for pyrolysis in the presence of the non-oxidising gas. Optionally, the solid feed is fluidised in a flow of the non-oxidising gas. The pyrolysis is conducted at a conventional pyrolysis temperature, such as between 350° C. and 900° C. (depending on the feed) to produce char and pyrolysis gas. The selectivity towards desirable pyrolytic cracking reactions, as opposed to undesirable oxidation reactions, is advantageously favoured by the low oxygen content in non-oxidising gas 136. The pyrolysis reaction is conducted in this way for a time period sufficient to convert feed 124 to char, typically a solids residence time of from 30 minutes to 6 hours. During this time, the pyrolysis gas combines with non-oxidising gas 136 to form gas mixture 144, which is discharged from first reaction zone 120 via gas outlet(s) 130.

Gas mixture 144 is fed via feed gas inlet(s) 142 to combustion zone 140, where it contacts oxygen-containing gas 148, for example air, which is introduced via oxidation gas inlet 146. At least some of the combustible pyrolysis gas components in the gas mixture combust in combustion zone 140 to form combustion product gas 152 and heat. Combustion product gas 152 is discharged from combustion zone 140 via combustion gas outlet 150. Heat 154 produced in the combustion is transmitted from combustion zone 140 to first reaction zone 120 to provide all or part of the heat of pyrolysis and thus to sustain the required pyrolysis reaction temperatures.

In some embodiments, the combustion in combustion zone 140 is controlled to provide substantially complete combustion of all the pyrolysis gas. Oxygen-containing gas 148 is thus added in excess such that combustion product gas 152 comprises substantial amounts of residual oxygen. Excess heat of combustion produced in combustion zone 140 may optionally be used to produce electrical power or steam by conventional means. Combustion product gas 152 may then be sent directly for post combustion scrubbing and venting.

In other embodiments, the addition of oxygen-containing gas 148 to combustion zone 140 is limited such that a substantial amount of residual uncombusted (or partially combusted) components are present in combustion product gas 152. For example, the addition of gas 148, and thus the degree of oxidation in combustion zone 140, may be the controllable variable used to maintain the pyrolysis temperature in reaction zone 120 within a desired range. In this case, partially combusted product gas 152 may be sent to a further combustor (not shown) where the remaining combustible products therein are combusted to extinction in the presence of excess oxygen, optionally using the heat to generate electrical power or steam.

After the period of time chosen to convert organic feed 124 to char, valve 134 is opened so that a flow of hydrocarbon-rich organic gas 138, for example biogas, is introduced to the first reaction zone. Optionally, the flow of non-oxidising gas 136 is simultaneously reduced or ceased entirely. In fluidised bed embodiments, the solids in the first reaction zone may thus be continually fluidised in a fluidising flow of gas, ensuring continuously good mixing and heat transfer. The hot char in the reactor is preferably not substantially cooled during the change of gas feed composition, and indeed system 100 is operated to increase the temperature in reaction zone 120 to a desired decomposition temperature before or after introducing hydrocarbon-rich organic gas 138, for example by increasing the transmission of heat 154 or by pre-heating hydrocarbon-rich organic gas 138.

At least a portion of the hydrocarbons in the hydrocarbon-rich organic gas 138 is thus catalytically decomposed on the hot char in first reaction zone 120 at a decomposition temperature which is higher than the pyrolysis temperature (or temperature range) used to produce the char, thus forming carbon nanomaterial deposits on the char and producing hydrogen. The elevated temperature in decomposition compared to pyrolysis may assist to form a higher quality, more carbon-rich and crystalline material and to produce a higher yield of hydrogen. Without wishing to be bound by any theory, it is also believed that the carbon deposition reaction is assisted by pyrolytic release of further volatile components from the char itself which occurs at the increased temperature.

The decomposition process step may be conducted at temperatures in excess of 600° C., such as from 700° C. to 1000° C. The decomposition temperature may affect the rate of decomposition as well as the morphology of the carbon deposits. The inventors have found that decomposition of methane on certain biochars at 700° C. produces carbon nanofiber deposits, while decomposition of methane or other organic gases on the biochars at 900° C. produces carbon nanosphere or carbon nanotube deposits. Higher decomposition temperatures, such as above 800° C., or 900° C. and above, may thus be particularly desirable. The selectivity towards the desirable decomposition reactions, as opposed to undesirable oxidation reactions, is advantageously favoured by the low oxygen content already present in first reaction zone 120 and in the feed of hydrocarbon-rich organic gas 138.

The decomposition reaction is conducted in this way for a time period sufficient to form carbon deposits on the char. Due to a rapid rate of deactivation, this time period may be less than 5 hours, or less than 1 hour, such as less than 30 minutes. During this time, the hydrogen and any other gas products combine with residual gas 138 to form gas mixture 144a, which is discharged from first reaction zone 120 via gas outlet(s) 130.

Gas mixture 144a is fed via feed gas inlet(s) 142 to combustion zone 140, where it contacts oxygen-containing gas 148, for example air, which is introduced via oxidation gas inlet 146. At least some of the combustible components in the gas mixture, including the hydrogen, combust in combustion zone 140 to form combustion product gas 152a and heat. Combustion product gas 152a is discharged from combustion zone 140 via combustion gas outlet 150.

Heat 154a produced in the combustion is transmitted from combustion zone 140 to first reaction zone 120 to provide all or part of the heat of decomposition and thus to sustain the required decomposition reaction temperatures. As during the pyrolysis stage, the combustion may be controlled during the decomposition stage either for complete or partial combustion of all combustible components in gas mixture 144a. If combustion is limited such that significant quantities of residual hydrogen remain in combustion product gas 152a, this hydrogen may either be combusted in a further downstream combustion unit or recovered as a source of hydrogen.

Once the decomposition process step is complete, valve 134 may be closed and valve 132 is opened. Composite carbonaceous product 146, comprising the char with carbon deposits thereon, is unloaded from the first reaction zone. A further amount of organic feed 124 is then added to initiate a new pyrolysis process step. System 100 is thus operated by sequential cycles of pyrolysis and carbon deposition.

Advantageously the integrated mode of sequential pyrolysis and carbon deposition achievable in system 100 provides a high degree of sequestration of overall carbon from both the pyrolyzable organic feed and the hydrocarbon-rich organic gas in a stable composite carbonaceous product. It is estimated that 30 to 50% of the total carbon may be sequestered. The composite material has a wide range of potential applications in soil amendment, soil remediation, water purification, environmental remediation and advanced materials (e.g. for battery storage and catalysts).

It is also considered that sequential pyrolysis-carbon deposition, involving immediate use of the hot char pyrolysis product as the catalyst for carbon deposition, will provide higher conversions of hydrocarbon-rich gases in the decomposition reaction and/or higher quality carbon nanomaterial deposits compared to the use of ostensibly similar pre-produced materials. Cooling of pyrolysis chars causes permanent reduction in size of the pores due to heterogeneous condensation, coagulation, nucleation and polymerisation reactions. Moreover, gaseous pyrolysis vapours may condense and react on the char surface, forming amorphous carbonaceous or tar layers and blocking the pores. Such undesirable changes are not reversible upon reheating.

A high degree of thermal efficiency is obtained in system 100, since i) the intermediate char product is used immediately and without substantial cooling as the substrate for high temperature carbon deposition in a subsequent reaction, and ii) the combustion of both pyrolysis gas and decomposition gas is used to sustain continuously high temperatures and drive the endothermic reactions in the reaction zone. Accordingly, the energy requirements of system 100 are low and indeed a favourable positive energy balance may be obtained, allowing the generation of electrical power and/or steam.

System 100 has the further advantage of process simplicity, which is highly desirable in many environments where pyrolysis is practiced, in particular the pyrolysis of biomass such as biosolids. A single reaction zone is used in gas feed switching mode to sequentially conduct pyrolysis and catalysed decomposition reactions, without the need to transfer solids from one reaction zone to another. The transition is easily managed by simply introducing a feed of hydrocarbon-rich organic gas to the reaction zone while optionally scaling back the initial feed of non-oxidising gas.

Figure 2:
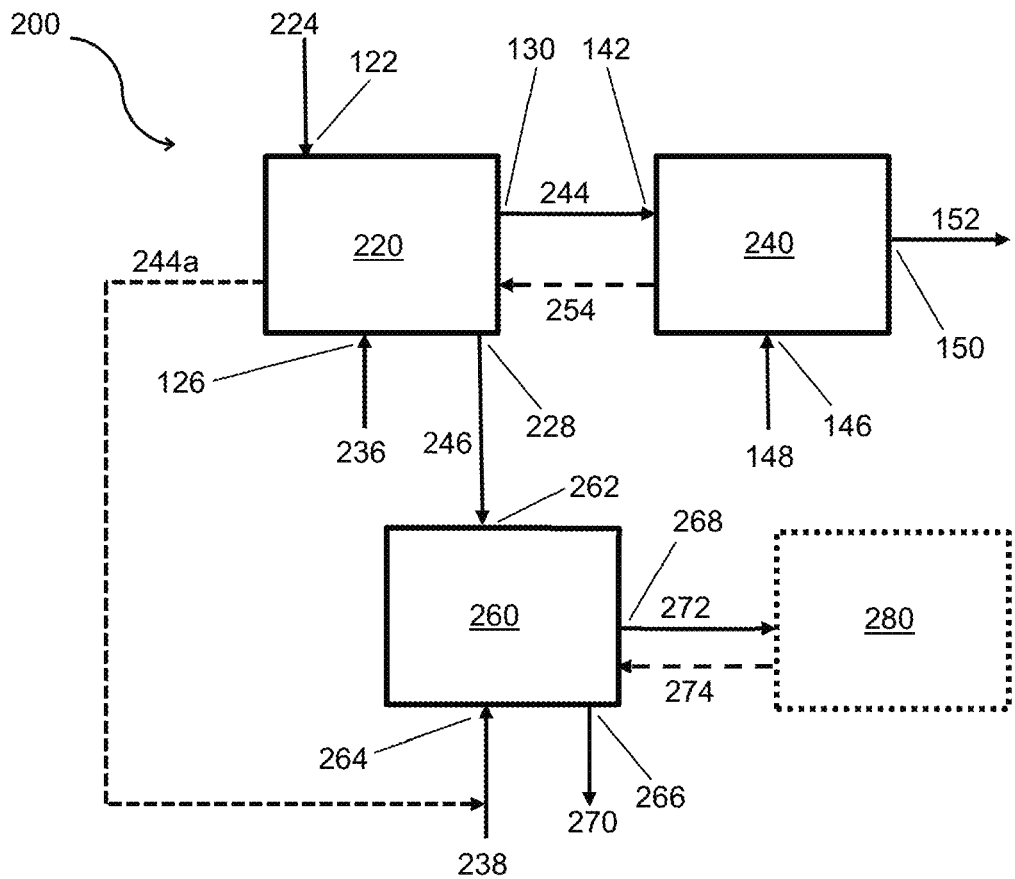
FIG. 2 schematically depicts a system for sequential pyrolysis and carbon deposition in different reaction zones, according to other embodiments of the invention.

Depicted in FIG. 2 is pyrolysis system 200 according to another embodiment of the invention. Similarly numbered items of system 200 are as described herein for system 100 depicted in FIG. 1.

In system 200, however, first reaction zone 220 is not necessarily configured for feeding a hydrocarbon-rich organic gas. Instead, system 200 comprises a second reaction zone 260 which may be a separate reaction zone within the same reaction vessel as first reaction zone 220 or in a different reaction vessel. Second reaction zone 260 is provided with char inlet 262, organic gas inlet 264, solids outlet 266 and one or more decomposition gas outlets 268. System 200 is configured such that hot char 246 is dischargeable from first reaction zone 220 into second reaction zone 260. For example, system 200 may comprise a rotary kiln or augur-type reactor which transfers the pyrolyzable organic feed through first reaction zone 220, where it is subjected to pyrolysis conditions in the presence of non-oxidising gas 236 for a suitable residence time, and into second reaction zone 260.

System 200 also comprises combustion zone 240, which may be a separate reaction zone within the same reaction vessel as first reaction zone 220 or in a different reaction vessel. Combustion zone 240 and first reaction zone 220 are thermally integrated as described for system 100, such that heat 254 produced by exothermic combustion reactions in combustion zone 240 can be transmitted to first reaction zone 120 to drive the endothermic pyrolysis reaction therein.

System 200 may optionally comprise a further combustion zone 280, configured to receive and combust the gas mixture discharged from second reaction zone 260. Combustion zone 280, if present, may optionally be thermally integrated with second reaction zone 260, such that heat 274 produced by exothermic combustion reactions in combustion zone 280 can be transmitted to second reaction zone 260 to drive the endothermic decomposition reactions therein.

In use, pyrolyzable organic feed 224 is fed into first reaction zone 220 and pyrolyzed in the presence of non-oxidising gas 236 to form hot char and pyrolysis gas. System 200 may be operated in a continuous mode, and thus feed 224 may be fed continuously. The pyrolysis gas combines with non-oxidising gas 236 to form gas mixture 244, which is discharged from first reaction zone 220 into combustion zone 240. At least a portion of the pyrolysis gas is then combusted in combustion zone 240 as described for system 100, with the heat used to drive the endothermic pyrolysis reaction in first reaction zone 220.

After a suitable residence time to convert organic feed 224, hot char is discharged via solid product outlet 228 and char inlet 262 into second reaction zone 260. The hot char is preferably not substantially cooled during the transfer, and the transfer may optionally be done continuously. Hydrocarbon-rich organic gas 238, for example biogas or a plastic pyrolysis gas, is fed into second reaction zone 260, where at least a portion of the hydrocarbons in the gas is catalytically decomposed on the hot char at a decomposition temperature which is higher than the pyrolysis temperature (or temperature range) in first reaction zone 220 where the char was produced. Carbon nanomaterial deposits are thus formed on the char and hydrogen is produced. The decomposition may be conducted at temperatures in excess of 600° C., and preferably in excess of 650° C., such as from 700° C. to 1000° C. The hydrogen and any other gas products combine with residual gas 238 to form gas mixture 272, which is discharged from second reaction zone 260 via decomposition gas outlet(s) 268. After a suitable residence time in second reaction zone 260, composite carbonaceous product 270, comprising the char with carbon deposits thereon, is unloaded from the second reaction zone. While system 200 may be operated continuously, it is nevertheless a process for sequential pyrolysis and carbon deposition as the char is formed first in a pyrolysis process step before deposition of the carbon deposits thereon in a decomposition process step.

Gas mixture 272 may optionally be sent to combustor 280 for combustion of the combustible components therein, and heat of combustion 274 may optionally be transmitted to second reaction zone 260 to drive the endothermic decomposition reactions therein. Alternatively, second reaction zone 260 may be heated by alternative means and the hydrogen may be recovered from gas mixture 168.

Like system 100, system 200 also provides an integrated mode of sequential pyrolysis and carbon deposition which sequestrates a high amount of carbon from both carbon-containing feeds in a stable carbonaceous composite material. Similarly, system 200 also provides thermal efficiency due to the transfer of the hot char intermediate without substantial cooling and the heat integration between combustion and at least the pyrolysis reaction. Moreover, system 200 provides a potential advantage of being continuously operable. Continuous operation is favourable in terms of process stability, particularly in larger scale units.

In a variation of process 200, pyrolysis gas stream 244a, comprising a portion of the pyrolysis gas product mixed with non-oxidising gas 236, is discharged from first reaction zone 220 and sent externally to form at least a part of hydrocarbon-rich organic gas 238 which is fed into second reaction zone 260. There, at least a portion of the hydrocarbons in the pyrolysis gas is catalytically decomposed on the hot char at a decomposition temperature higher than the pyrolysis temperature in first reaction zone 220, thus forming carbon nanomaterial deposits on the char and producing hydrogen. The elevated decomposition temperature favours the desired decomposition reaction to form high quality crystalline carbon deposits, preferably including carbon nanomaterials. By contrast, the pyrolysis temperature may be too low to allow significant decomposition of pyrolysis gas during the pyrolysis process step. In this embodiment also, a portion of the pyrolysis gas is sent via gas mixture 244 to combustion zone 240 and combusted therein to drive the endothermic pyrolysis reaction.

Further details of each process unit in the systems of the invention, and the steps of the methods of the invention, will now be described.

Pyrolysis

The methods of the invention involve a step of pyrolyzing a pyrolyzable organic feed in the presence of a non-oxidising gas in a reaction zone configured for high temperature endothermic reaction. The solid feed is pyrolyzed at high temperatures, i.e. the pyrolysis temperature, to produce hot char and pyrolysis gas. The non-oxidising gas generally has a low oxygen content and thus provides a suitable environment for pyrolytic cracking reactions to occur so that a high-quality char (solid carbonaceous material) is produced. The pyrolysis gas and the non-oxidising gas combine in the reaction zone to form a gas mixture, which is subsequently discharged for combustion.

The non-oxidising gas is suitably non-oxidising to provide a favourable environment for pyrolysis reactions to occur. It may be an inert gas such as $N_2$, $CO_2$ Ar, and their mixtures. The non-oxidising gas should thus generally have a low oxygen ($O_2$) content, such as less than 4 weight %, or less than 2 weight %, or less than 1 weight %, since desirable pyrolysis reaction selectivity is obtained through endothermic cracking reactions in the absence of oxidants. However, it is not necessarily required that oxygen is completely excluded. For example, the non-oxidising gas may include as at least a component a recycled flue gas from combustion which contains some residual oxygen. The advantages provided by the use of such a gas, for example through heat integration and/or the reduction in consumption of an external inert gas supply, may outweigh the disadvantages of introducing some oxygen to pyrolysis in certain embodiments.

In some embodiments, the non-oxidising gas flows into and through the reaction zone during the pyrolysis. The flow may contribute to a positive pressure differential between the pyrolysis reaction zone and the downstream combustion zone. This may advantageously favour forward flow of the gas mixture into the combustion zone while preventing or substantially limiting an unwanted reverse flow of oxidising gases from the combustion zone into the pyrolysis reaction zone. In embodiments where the organic feed is fluidised in the pyrolysis reaction zone, the solid organic feed and resultant char may be fluidised in the flow of the non-oxidising gas. This may advantageously improve mixing and heat transfer in the pyrolysis reaction zone.

The invention is applicable to a wide range of solid pyrolyzable organic feeds, including 1) waste such as plastics, tyres or any other solid hydrocarbon-containing waste or their blends; 2) biomass such as wood, straw, rice husk, coffee husk and any other type of biomass materials; 3) coal such as anthracite, bituminous, sub-bituminous, lignite or any other coal blends; 4) dried algae; 5) biosolids or sewage sludge; 6) food-waste; 7) any type of solid organic or inorganic human waste; 8) biomass waste such as green waste or agricultural residue or their blends and 9) hybrid inorganic and organic waste such as municipal solid waste. For the avoidance of doubt, the term "pyrolyzable organic feed" as used herein refers to any feed that contains at least a portion of an organic, carbon-containing material from any source, including synthetic, mineral and bio-based sources, that can be pyrolyzed to produce pyrolysis products.

Industrial pyrolysis reactions may be performed at 350-900° C., depending on the feed and the target products, and the pyrolysis step of the invention may be operated in this temperature range. Where the feed is a waste plastic, for example, a relatively low temperature, such as 350° C. to 550° C., may be appropriate. Where the feed is biomass, for example biosolids derived from sewage, a relatively higher reaction temperature, such as 500° C. to 900° C., may be preferred. The pyrolysis of the pyrolyzable organic feed may take place across a range of temperatures in the pyrolysis process step, for example via a temperature ramp with a final hold temperature. The pyrolysis temperature in this case refers to the temperature or temperature range at which pyrolytic conversion of the pyrolyzable organic feed to the char predominantly takes place.

Pyrolysis reactions generally produce a mixture of products, which on cooling include solid carbonaceous products (char), an oil (condensable) fraction and a gas (non-condensable) fraction. The fractions of gas, oil and char produced as primary products in a pyrolysis process vary with the heating rate, pyrolysis temperature and feedstock, and pyrolysis processes may be classified accordingly into three process types: slow pyrolysis, fast pyrolysis and flash pyrolysis. Slow pyrolysis generally produces more char, fast pyrolysis produces more oil fraction and flash pyrolysis produces more gas fraction. It will be appreciated that the oil product fraction of the pyrolysis reaction is substantially in vapour form when produced at the high reaction temperature in the pyrolysis zone. Accordingly, where the present disclosure refers to the production of "pyrolysis gas", or its further reaction by combustion, the "pyrolysis gas" is to be understood to include both the non-condensable gas fraction and the vaporised (but condensable) oil fraction.

The pyrolyzable organic feed may be added continuously, periodically or initially to the pyrolysis reaction zone. Suitable residence times of solids in the pyrolysis reaction zone may be from 10 minutes to one hour, for example 25 to 30 minutes. Suitable pressures in the pyrolysis reaction zone may be between 1 and 10 bar, for example between 1 and 3 bar.

Pyrolysis is an endothermic reaction, and thus requires an input of energy, i.e. the heat (or enthalpy) of pyrolysis. At least a portion of the required energy input is provided by combustion of the combustible components, including the pyrolysis gas product, in the gas mixture which is sent from the pyrolysis reaction zone to the combustion zone. The pyrolysis and combustion reactors are thus thermally integrated as will be described in greater detail hereafter.

In some embodiments, an activation additive may be added to the pyrolysis reaction zone before or during the pyrolysis reaction. The activation additive causes an increase in the surface area of the product char, for example relative to hot char produced under the same conditions in the absence of the additive. Suitable additives may include, but are not limited to, metal hydroxides such as KOH and NaOH. Optionally, the activation additive may be mixed with or otherwise added together with the pyrolyzable organic feed.

The systems according to the invention include at least one reactor for conducting endothermic reactions. The reactor for pyrolysis includes a reaction zone, one or more gas inlets and one or more gas outlets, and is configured for feeding the non-oxidising gas to the reaction zone via at least one gas inlet and to receive the pyrolyzable organic feed in the reaction zone for pyrolysis. The solid feed may be fed to the reaction zone via a solid feed inlet. The gas mixture comprising pyrolysis gas and the non-oxidising gas is discharged from the reaction zone via the gas outlet(s).

In some embodiments, the reactor is a fluidised bed reactor or a packed bed reactor. In the case of a fluidised bed reactor, the reactor may be configured to fluidise the solids in the flow of non-oxidising gas. The reactor is configured for performing the endothermic pyrolysis reaction, and thus provides for an influx of heat into the reaction zone. As will be described in greater detail hereafter, the endothermic reactor is thus thermally integrated with the combustion reactor to allow the heat of combustion produced therein to drive the pyrolysis reaction.

Combustion

The methods of the invention involve a step of discharging the gas mixture from the pyrolysis reaction zone to a combustion zone and combusting at least a portion of the pyrolysis gas therein. Heat produced by the combusting of the pyrolysis gas is transmitted from the combustion zone to the pyrolysis reaction zone to provide at least a portion of the heat of pyrolysis.

The systems of the invention include at least one combustor which includes a combustion zone, one or more feed gas inlets for receiving the gas mixture discharged from the first reaction zone in the combustion zone, an oxidation gas inlet for introducing an oxygen-containing gas to the combustion zone, and a combustion product gas outlet for discharging the combustion flue gas. The combustor is thermally integrated with the endothermic reactor such that heat produced by the combusting of the pyrolysis gas is transmitted from the combustion zone to the first reaction zone to provide at least a portion of the heat of pyrolysis.

The gas mixture from pyrolysis may be the only source of combustible products introduced to the combustor during the pyrolysis stage, at least during continuous operation (i.e. post start-up). Optionally, however, the combustor may be configured to feed and combust another fuel source (for example natural gas or biogas). This may be particularly useful during start up to achieve suitable temperatures in the combustion zone or pyrolysis zone, or to sustain the required temperatures during periods of lower pyrolysis gas production rates.

The oxygen-containing gas is most conveniently air, but it is not excluded that other oxygen sources are used. The oxygen-containing gas may be pre-heated, for example by indirect contact with the hot flue gases, for thermal efficiency.

The combustion zone of the combustor is operated at temperatures where combustion reactions of the combustible components in the gas mixture will occur. The operating temperature may thus be between 700° C. and 1300° C., or between 700° C. and 1100° C., such as between 800° C. and 1000° C., for example about 900° C. During continuous operation, such temperatures may be sustained by the exothermic oxidation reactions occurring in the combustion zone.

In some embodiments, the combustor is operated to provide substantially complete combustion of all combustible products in the combustion zone. Oxygen is thus added in excess, and high combustion temperatures may be favoured. Sufficient oxygen may be added such that the combustion product gas contains at least 5 wt % oxygen, or at least 10 wt % oxygen. Such conditions favour high conversion of the combustible products. Excess heat of combustion produced in the combustion zone may be used to produce electrical power or steam. This may be done using a heat exchanger inside or otherwise thermally coupled to the combustion zone, or it may be done downstream of the combustor using heat carried in the discharged combustion gas.

In other embodiments, the combustor is operated to provide only partial combustion of the combustible components fed to the combustion zone. The oxygen supply may be limited such that a substantial amount of residual uncombusted (or partially oxidised) components are present in the combustion product gas. The degree of combustion may be controlled by regulating the oxygen feed so as to maintain the temperature in the pyrolysis reaction zone within a target range. Residual combustible products in the combustion product gas may be combusted downstream of the combustor, with optional generation of electrical power or steam.

Heat-Integrated Pyrolysis and Combustion

The endothermic reactor and the combustor are thermally integrated so that the heat of combustion provides a portion, or substantially all, of the heat of pyrolysis. The means of thermal integration is not considered to be particularly limited. For example, the hot flue gases from combustion may be used to heat the endothermic reaction zone using a heat exchanger.

In some embodiments, the pyrolysis reaction zone and the combustion zone are separated by a heat-transmissive partition which allows heat flow from the combustion zone, operated at a higher temperature, to the pyrolysis zone, operated at a lower temperature. The partition may either be impermeable or comprise a plurality of apertures, as will be described hereafter.

Figure 3:
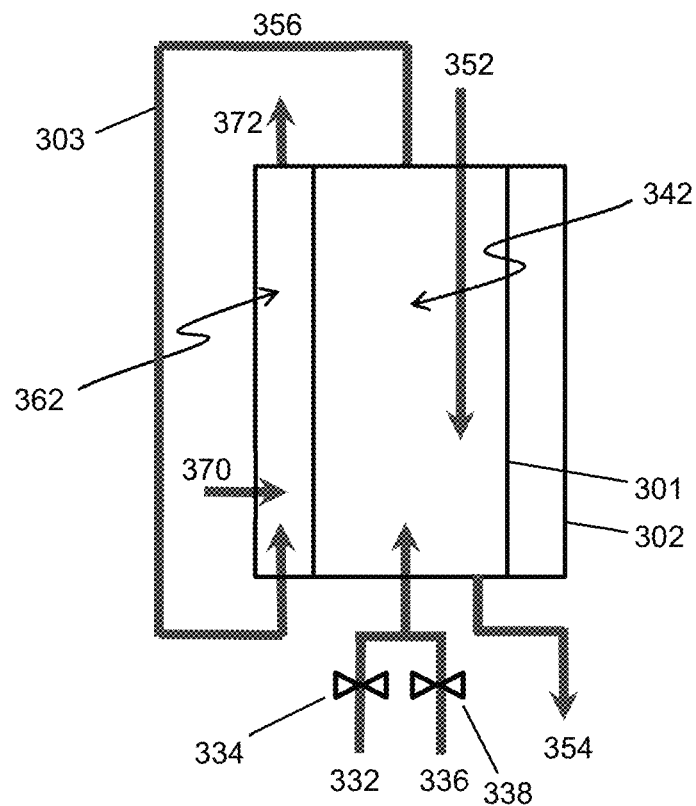
FIGS. 3 and 3A schematically depict in side and plan view an endothermic reactor, configured for sequential pyrolysis and carbon deposition, with a heat-integrated combustor, according to embodiments of the invention.
Figure 3A:
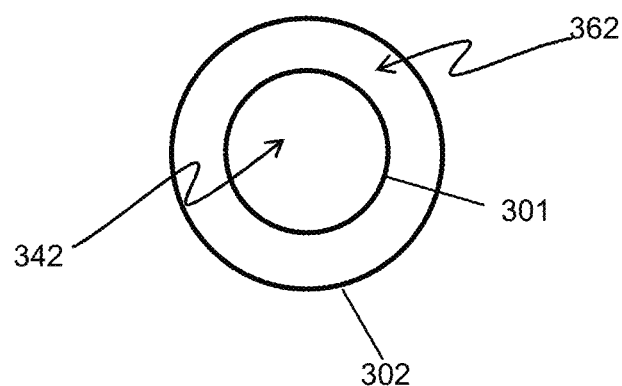

Depicted in FIGS. 3 and 3A is an integrated endothermic reactor-combustor according to embodiments of the invention. The endothermic reactor comprises reaction zone 342 for pyrolysis, configured to receive a pyrolyzable organic feed 352 and non-oxidising gas 332. The flow of non-oxidising gas is regulated by valve 334. The combustor comprises combustion zone 362 adjacent to pyrolysis reaction zone 342, with impermeable metal partition 301 defining a boundary between the pyrolysis and combustion zones. The pyrolysis reaction zone is cylindrical, and the combustion zone is an annulus between outer walls 302 and cylindrical partition 301, as schematically depicted in side view in FIG. 3 and in plan view in FIG. 3A.

In use during the pyrolysis process step, organic feed 352 and non-oxidising gas 332 are fed to pyrolysis reaction zone 342. Optionally, the solid feed is fluidised in the non-oxidising gas. The organic feed pyrolyzes at a pyrolysis temperature of between 350° C. and 900° C. to produce pyrolysis gas and char. The pyrolysis gas combines with the non-oxidising gas to form gas mixture 356, which is discharged from the pyrolysis reaction zone and transported by external pipework 303 to combustion zone 362. There, the combustible components in the gas mixture are at least partially combusted with the oxygen introduced in air feed 370. Combustion product gas 372 is discharged from the combustion zone and may be sent on to a further combustor, energy recovery or post-combustion processing as described herein. A portion of the heat of combustion is transferred from combustion zone 342 through metallic partition 301 by conduction, thereby driving the endothermic pyrolysis reaction in reaction zone 342. Metallic partition 301 may be configured for increased heat transfer, for example via fins or the like.

Figure 4:
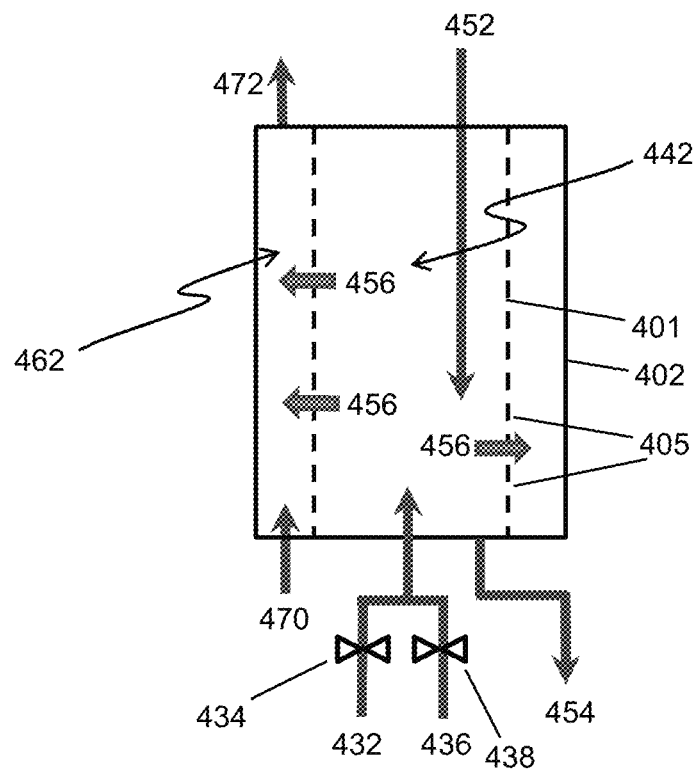
FIGS. 4 and 4A schematically depict in side and plan view an endothermic reactor, configured for sequential pyrolysis and carbon deposition, with a heat-integrated combustor, according to other embodiments of the invention.
Figure 4A:
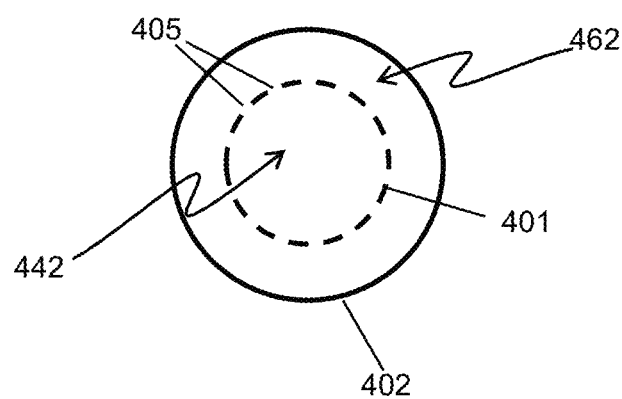

Depicted in FIGS. 4 and 4A is an integrated endothermic reactor-combustor according to other embodiments of the invention. The endothermic reactor comprises reaction zone 442 for pyrolysis, configured to receive a pyrolyzable organic feed 452 and non-oxidising gas 432. The combustor comprises combustion zone 462 adjacent to pyrolysis reaction zone 442, with heat-transmissive metal partition 401 defining a boundary between the pyrolysis and combustion zones. The pyrolysis reaction zone is cylindrical, and the combustion zone is an annulus between outer walls 402 and cylindrical partition 401, as schematically depicted in side view in FIG. 4 and in plan view in FIG. 4A. Partition 401 is preferably made of a thermally conductive material (typically metal) and includes a plurality of apertures 405 providing fluid communication between the pyrolysis reaction zone and the combustion zone.

In use during the pyrolysis process step, organic feed 452 and non-oxidising gas 432 are fed to pyrolysis zone 442. Optionally, the solid feed is fluidised in the non-oxidising gas. The organic feed pyrolyzes at a temperature of between 350° C. and 900° C. to produce pyrolysis gas and char. The pyrolysis gas combines with the non-oxidising gas to form gas mixture 456, which is discharged from the pyrolysis reaction zone by flowing through apertures 405 into combustion zone 462. There, the combustible components in the gas mixture are at least partially combusted with the oxygen introduced in air feed 470. Combustion product gas 472 is discharged from the combustion zone and may be sent on to a further combustor, energy recovery or post-combustion processing as described herein.

Partition 401, and in particular the distribution and size of apertures 405 therein, is configured such that a pressure differential is maintained between reaction zone 442 and combustion zone 462. The resulting flow velocity of the gas mixture through the apertures is sufficient to prevent or suitably limit ingress of oxygen from the combustion zone into the pyrolysis zone.

As a result of a higher temperature maintained in the combustion zone, heat is transferred through partition 401 from combustion zone 462 to pyrolysis reaction zone 442. The heat transfer occurs both by conduction through the thermally conductive partition material and by convection through apertures 405, thereby providing a portion of the heat necessary to drive the endothermic pyrolysis reaction in the pyrolysis reaction zone. The degree of combustion in combustion zone 462 may be controlled to regulate the temperature in the pyrolysis zone. For example, the control may be responsive to a temperature measured in the endothermic pyrolysis zone, so as to maintain a constant or range-bound reaction temperature. In practice, the temperature in the combustion zone may be greater than that in the pyrolysis reaction zone by about 50 to 300° C., or 100 to 200° C.

Heat transfer through partition 401 is highly efficient as a result of the combined convective and conductive heat transfer modes. Moreover, the heat of combustion transferred from the combustion zone to the pyrolysis zone is generally sufficient to provide the heat of pyrolysis, such that an external energy input into the process is not required. Other benefits such as reduced weight and cost, for example via use of a simple mesh partition, are also envisaged. The complexity and/or operability of the system may also be improved, since hot, unstable pyrolysis gas need not be piped externally from the pyrolysis reaction zone to the combustion zone.

Integrated pyrolyzer-combustor reactions systems have been described in greater detail in the applicant's co-pending PCT application PCT/AU2019/050548, which is hereby incorporated by reference. The pyrolyzer and combustor of the present invention may be configured and operated according to any of the embodiments disclosed therein.

When the endothermic reactor is a fluidised bed reactor, the combustion zone may be extended via heat transfer tubes or other conduits that convey the hot flue gas through the fluidised bed in the pyrolysis reaction zone. This arrangement provides higher heat transfer surface area (through the tubes) between pyrolysis and combustion zones and thus improves the overall heat integration between the pyrolysis and combustion reactions. The heat transfer mode in this case may be dominated by an additional particle convection term (other than gas convection, radiation and conduction) at moderate temperatures. The higher heat transfer from the particle convection term is mainly attributed to the increased particle movement across the heat transfer wall (i.e. tubes).

Figure 7:
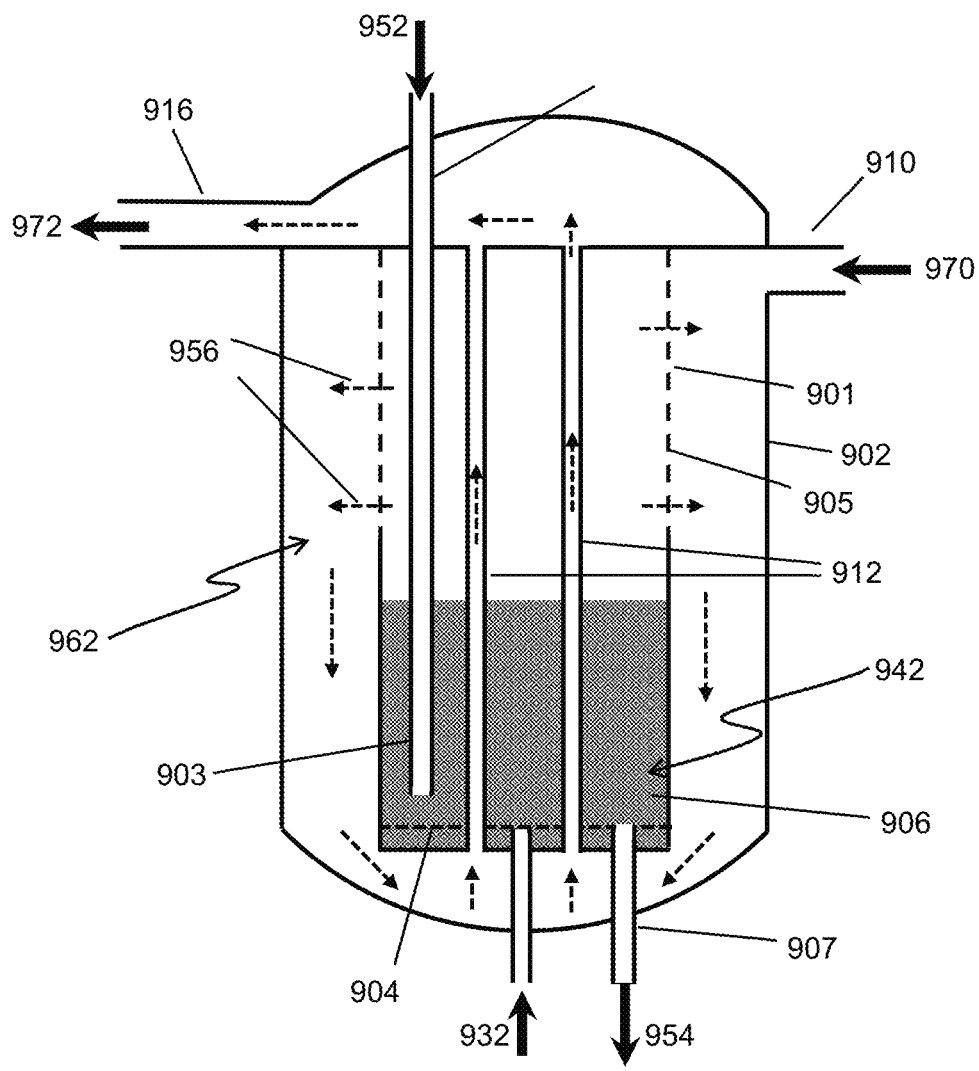
FIGS. 7 and 7A schematically depict side and plan views of an endothermic reactor, configured for sequential pyrolysis and carbon deposition, with a heat-integrated combustor, according to another embodiment of the invention.
Figure 7A:
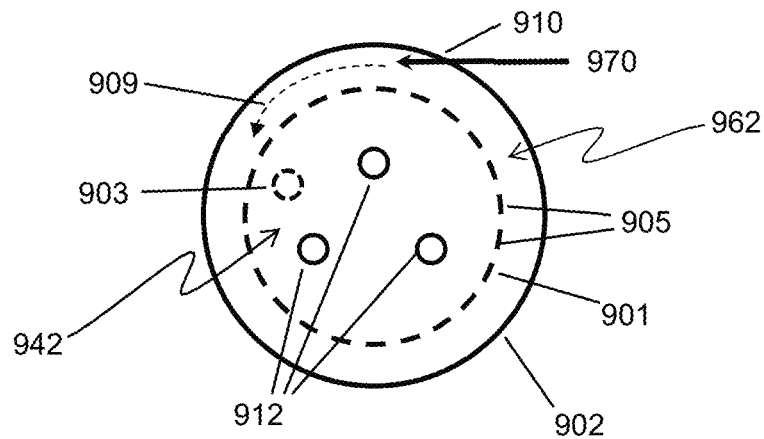

Depicted in FIGS. 7 and 7A is an integrated endothermic reactor-combustor according to such an embodiment of the invention. The endothermic reactor comprises pyrolysis zone 942, configured to receive a pyrolyzable organic feed 952 via feed line 903 and fluidise this feed and the resultant char product in non-oxidising gas 932. Gas 932 is distributed through distributor plate 904 so that the solids are fluidised in bed 906.

The combustor comprises combustion zone 962 adjacent to pyrolysis reaction zone 942, with heat-transmissive metal partition 901 defining a boundary between the pyrolysis and combustion zones. The pyrolysis reaction zone is cylindrical, and the combustion zone is an annulus between outer walls 902 and cylindrical partition 901, as schematically depicted in side view in FIG. 7 and in plan view in FIG. 7A. Partition 901 is preferably made of a thermally conductive material (typically metal) and includes a plurality of apertures 905 in the top section of the partition providing fluid communication between the pyrolysis reaction zone and the combustion zone. Air 970 is fed to the combustor via air inlet 910. As seen in FIG. 7A, inlet 910 is configured to feed a jet of air 970 tangentially into annular combustion zone 962. Thus, in use, a cyclonic or vortex-like flow is created adjacent outer walls 902, as depicted by arrow 909. The combustion reaction in combustion zone 962 may thus primarily take place close to outer walls 902, and thus removed from partition 901. The integrated reaction system includes a plurality of heat transfer tubes 912 which direct the hot combustion flue gases from combustion zone 962 through fluidised bed 906 in pyrolysis reaction zone 942 and eventually out of the reactor system via outlet port 916 as combustion product gas 972. Three such tubes are depicted in spaced apart configuration in FIG. 7A, but it will be appreciated that one, two or more than three tubes may be used.

In use during the pyrolysis process step, organic feed 952 and non-oxidising gas 932 are fed to pyrolysis reaction zone 942, and the solid feed is fluidised by the non-oxidising gas in fluid bed 906. The organic feed pyrolyzes at a temperature of between 350° C. and 750° C. to produce pyrolysis gas and hot char. The pyrolysis gas combines with the non-oxidising gas to form gas mixture 956, which is discharged from the pyrolysis reaction zone by flowing through apertures 905 into combustion zone 962. There, the combustible components in the gas mixture are at least partially combusted with the oxygen introduced in air feed 970. The hot combustion gases flow downwards in the combustion zone (in a vortex flow), then up through heat transfer tubes 912 and out via outlet port 916 (see dotted arrows in FIG. 7). Combustion product gas 972 may be sent on to a further combustor, energy recovery or post-combustion processing as described herein.

Heat from the combustion reaction is thus transferred to the pyrolysis reaction zone both through partition 901 and through the walls of heat transfer tubes 912. The heat transfer occurs by conduction through the thermally conductive partition and tube materials, by convection through apertures 905 and by an additional particle convection term as described herein. At least a portion of the heat necessary to drive the endothermic pyrolysis reaction in thus provided with excellent heat transfer efficiency in the pyrolysis zone.

In a further variation of an integrated endothermic reactor-combustor, pyrolysis is conducted in a plurality of heat exchange tubes which are spaced apart, arranged vertically and pass through a combustion zone. The pyrolyzable organic feed is fluidised in the heat exchange tubes by an upward flow of a non-oxidising gas. The heat exchange tubes comprise tube walls (which constitute heat-transmissive partitions) having a plurality of apertures, preferably above the level of the fluidised bed, through which the mixture of pyrolysis gas and non-oxidising gas flow into the combustion zone for combustion of a portion of the pyrolysis gases. This shell and tube type arrangement of combustor and pyrolysis zones provides excellent heat-integration between the combustion and pyrolysis reactions.

Catalytic Decomposition

The methods of the invention involve a decomposition process step comprising contacting a hydrocarbon-rich organic gas with the hot char directly after its production in the pyrolysis process step. The hydrocarbon-rich organic gas catalytically decomposes on the hot char at a decomposition temperature which is higher than the pyrolysis temperature, thereby producing gaseous decomposition products including hydrogen and a composite carbonaceous material comprising the char with carbon deposits thereon. As used here, a hydrocarbon-rich organic gas is in the gas phase during the decomposition process, and may be either condensable or non-condensable at ambient temperature conditions. The catalytic decomposition of a range of hydrocarbons may be considered a chemical vapour deposition (CVD) process, or in the specific case of a methane-rich feedstock the process may be considered as a catalytic methane decomposition (CMD) process.

In some embodiments, the hydrocarbon-rich organic gas is substantially free of the pyrolysis gas, or components thereof, produced in the pyrolysis process step, these components being sent to combustion instead. Such a process configuration provides the opportunity to upgrade a further hydrocarbon-containing stream, for example biogas or plastic pyrolysis gas as will be explained hereafter.

In the case of a methane-rich feedstock, such as biogas, the methane decomposition reaction, according to equation (1), will be catalysed on the hot char surface:

$$CH_4 \rightarrow C + 2H_2 \Delta H_{298K} = 74.52 \text{ kJ/mol} \qquad (1)$$

Similar reactions are involved for larger hydrocarbon molecules, for example those produced by pyrolysis of plastic (polymeric) materials. In this case a mixture of hydrocarbon and hydrogen gaseous decomposition products are formed. The inventors have found by experiment that either methane or polypropylene pyrolysis product gas (containing predominantly linear $C_1$-$C_{10}$ hydrocarbons) may be catalytically decomposed on pyrolysis biochar, thereby forming carbon nanomaterial deposits on the char.

The catalysed decomposition reaction takes place on the hot char directly after its production via pyrolysis. As used herein, "directly after" means that the process steps are consecutive in that the hot char is immediately contacted with the hydrocarbon-rich organic gas following its production in pyrolysis. While some loss of char temperature between the process steps is not excluded, the char remains hot throughout its formation and subsequent use in carbon deposition. In particular, the char is not cooled to ambient conditions or stored between formation and use as a catalyst.

In some embodiments, the hot char remains continuously at temperatures of above 300° C., or above 400° C., or above 600° C., such as above 700° C., between its production in the pyrolysis and the catalytic decomposition of the hydrocarbon-rich organic gas on the hot char. In some embodiments, the time between the commencement of pyrolysis of the pyrolyzable organic feed and commencement of hydrocarbon-rich organic gas decomposition on the resulting char product is no more than 1 hour.

The sequential mode of pyrolysis and carbon deposition used in the invention provides a number of advantages. In particular, the decomposition catalyst is generated in situ in the process, thus avoiding the need to purchase or separately produce a catalyst. This is particularly advantageous in environments where pyrolysis is already attractive, for example at a waste water treatment plant where pyrolysis is used to process biosolids. Moreover, a high degree of thermal efficiency is obtained because the hot char product of pyrolysis already holds substantial process heat when deployed as the carbon deposition catalyst. Furthermore, the immediate use of the hot char pyrolysis product may provide improved catalyst performance, i.e. higher conversions of hydrocarbon-rich organic gases to carbon deposits and/or higher quality carbon nanomaterial deposits compared to the use of ostensibly similar pre-produced materials. Cooling of pyrolysis chars causes morphological changes including a permanent reduction in size of the pores due to heterogeneous condensation, coagulation, nucleation and polymerisation reactions. Moreover, gaseous pyrolysis vapours may condense and react on the char surface, forming carbonaceous or tar layers and blocking the pores. Such undesirable changes are not reversible upon reheating.

The hydrocarbon decomposition reaction is endothermic, requiring an input of energy, i.e. the heat (or enthalpy) of decomposition. In some embodiments, at least a portion of this energy is provided by combustion of the gaseous decomposition products (including the hydrogen) and any residual unreacted hydrocarbons in the feed.

High reaction temperatures, typically in the range of 600° C. to 1100° C., are required to produce significant conversions. In some embodiments, the catalytic decomposition is conducted at a decomposition temperature of at least 700° C., such as at least 800° C. The decomposition temperature is higher than the pyrolysis temperature at which the precursor char was produced in the pyrolysis process step. The elevated temperature in decomposition compared to pyrolysis may assist to form a higher quality, more carbon-rich and crystalline material and to produce a higher yield of hydrogen. By contrast, amorphous coke which blocks the char porosity may be formed at typical pyrolysis temperatures. Without wishing to be bound by any theory, it is also believed that the carbon deposition reaction to form carbon nanomaterials is assisted by pyrolytic release of further volatile components from the char itself, which occurs due to the increase in temperature. In some embodiments, the catalytic decomposition temperature is no more than 200° C., or no more than 100° C. higher than the temperature during the pyrolyzing.

It will be appreciated that carbon deposition should generally be conducted in an inert or reducing atmosphere where the carbon deposition reaction predominates over exothermic oxidation reactions. The hydrocarbon-rich organic gas thus generally has a low oxygen content, for example less than 4 wt %, or less than 1 wt %, or substantially zero.

The hydrocarbon deposition reaction produces gaseous decomposition products including hydrogen. In the case of methane-rich feeds, hydrogen may be the predominant gaseous product. As will be described hereafter, the gaseous decomposition products may optionally be combusted to provide the heat of decomposition. Optionally, however, the methods of the invention may include a step of separating the gaseous decomposition products and any residual hydrocarbon-rich organic gas from the composite carbonaceous material and separating hydrogen from the gas composition. Hydrogen may thus be a product of the process. The recovered hydrocarbons may be recycled for further decomposition reaction.

Decomposition Reaction Zone

As already described herein, for example with reference to FIG. 1, the catalysed hydrocarbon decomposition reaction may be conducted in the same endothermic reaction zone where the char is produced. The char is thus consecutively produced under pyrolysis conditions and, once produced, exposed to the hydrocarbon-rich organic gas for decomposition thereof in the same reaction zone. Suitable configurations for this approach may include fluidised and packed bed reactors.

Alternatively, for example as described with reference to FIG. 2, the char may be transferred directly from the pyrolysis reaction zone where it was produced to a different reaction zone to contact and decompose the hydrocarbon-rich organic gas. Non-limiting examples of suitable configurations for this approach may include rotary kiln or augur-type reactor which transfer the pyrolyzable organic feed through the pyrolysis reaction zone and into a different decomposition reaction zone.

In each case, the heat of reaction for the endothermic decomposition reaction may be supplied by a combustor which is thermally integrated with the respective endothermic reaction zone. The reaction system is also configured to allow an increase in temperature between the consecutive pyrolysis and decomposition process steps. This may be achieved, for example, by controlling the respective combustor for increased heat flow from to the decomposition reaction zone and/or by pre-heating the hydrocarbon-rich organic gas before contact with the hot char.

Depicted in FIGS. 3 and 3A is an integrated endothermic reactor-combustor according to embodiments of the invention. This system, and the production therein of hot char from pyrolyzable organic feed 352 in reaction zone 342, with heat input from adjacent combustion zone 362, has already been described. Once the hot char is formed in reaction zone 342, the catalysed decomposition reaction is initiated by opening valve 338 to introduce hydrocarbon-rich organic gas 336 to the reaction zone. Optionally, valve 334 is simultaneously closed to reduce or cease the flow of non-oxidising gas 332. If the char is being fluidised in the reactor, fluidisation may thus continue with minimal interruption despite the change in composition of the fluidising gas. The temperature in reaction zone 342 is increased to a decomposition temperature which is higher than the pyrolysis temperature between pyrolysis and decomposition steps, for example either immediately before or after introducing hydrocarbon-rich organic gas 336 to the reaction zone. At this elevated temperature in the range of 700° C. to 1100° C., hydrocarbons in feed gas 338 are catalytically decomposed on the hot char surface in reaction zone 342, producing gaseous decomposition products including hydrogen and forming carbon deposits such as carbon nanomaterials on the char.

The gaseous decomposition products and unreacted hydrocarbons in the feed are discharged from reaction zone 342 and transported by external pipework 303 to combustion zone 362. There, the combustible components, including hydrogen, are at least partially combusted with the oxygen introduced in air feed 370. Combustion product gas 372 is discharged from the combustion zone and may be sent on to a further combustor, energy recovery or post-combustion processing. A portion of the heat of combustion is transferred from combustion zone 342 through metallic partition 301 by conduction, thereby driving the endothermic carbon decomposition reaction in reaction zone 342. Thus, the heat of decomposition is provided to reaction zone 342 in a substantially similar manner to the heat of pyrolysis during the pyrolysis stage.

After the carbon deposition reaction is completed, the flow of hydrocarbon-rich organic gas 336 may be replaced with flow of non-oxidising gas 332, and the composite carbonaceous product 354 is unloaded.

Similarly, in the system depicted in FIGS. 4 and 4A, after opening valve 438 to introduce hydrocarbon-rich organic gas 436 and thus initiate decomposition, and increasing the temperature to the elevated decomposition temperature, the gaseous decomposition products and unreacted hydrocarbons in the feed are discharged from reaction zone 442 to combustion zone 462 via apertures 405. Heat produced by combustion of the combustible components, including hydrogen, is transmitted back into reaction zone 442 both by conduction through the thermally conductive partition material and by convection through apertures 405. The advantages of this arrangement during the carbon deposition stage are similar to those described for the pyrolysis stage.

Similarly, in the system depicted in FIGS. 7 and 7A, the decomposition process step can be initiated after the pyrolysis process step (as described herein) by introducing hydrocarbon-rich organic gas to endothermic reaction zone 942 via distribution plate 904. The hot char thus remains continuously fluidised in fluid bed 906, and the temperature of the char is elevated to the desired decomposition temperature. The hydrocarbon-rich organic gas catalytically decomposes on the hot char, and the gaseous decomposition products and unreacted hydrocarbons in the feed are discharged from reaction zone 942 to combustion zone 962 via apertures 905. There, the combustible components in the gas mixture are at least partially combusted with the oxygen introduced in air feed 970, and the hot combustion gases are conveyed through the endothermic reaction zone in heat exchange tubes 912. Heat from the combustion reaction is thus transferred to the endothermic reaction zone both through partition 901 and through the walls of transfer tubes 912, as described for the pyrolysis process step. After the decomposition process step, composite carbonaceous material 954, comprising the char with carbon deposits thereon, is unloaded via outlet 907.

It will be appreciated that similar approaches to heat integration of endothermic decomposition and exothermic combustion may be used when the char is transferred to a second reaction zone for the decomposition reaction.

Composite Carbonaceous Products

The catalytic decomposition reaction produces carbon deposits on the char previously formed in pyrolysis. The methods of the invention thus produce a composite carbonaceous material comprising the char together with the carbon deposits formed thereon. The carbon deposits are generally crystalline carbon-rich materials, and may advantageously be in the form of carbon nanomaterials, for example carbon nanofibers, carbon nanospheres, carbon nanotubes or other crystalline carbon nanostructures. Carbon nanomaterials, as used herein, refer to solid carbon material structures having at least one nanosized (1-100 nm) dimension. Such composite materials have a wide range of potential applications in soil amendment, soil remediation, water purification environmental remediation and advanced materials (e.g. for battery storage and catalysts).

The inventors have shown by experiment that biochars, for example produced from biosolids or other biomass, may be used to catalyse the formation of a variety of carbon nanostructures. One approach to manipulate the morphology of the carbon nanomaterials is by controlling the temperature of the hydrocarbon decomposition reaction.

The composite carbonaceous material may comprise at least 5 wt % of the carbon deposits, such as at least 10 wt % of the carbon deposits, or at least 20 wt % of the carbon deposits. Higher deposition temperatures may favour increased yields. Surprisingly, the inventors have found that up to 25 wt % carbon deposits may be deposited on biosolids-derived biochar at 900° C.

It is considered a particular advantage of the invention that carbon from both the pyrolyzable organic feed and the hydrocarbon-rich organic gas are sequestered in a stable composite carbonaceous product. In some realistic use cases it is estimated that 30 to 50% of the total carbon in the two feeds may be sequestered, a highly favourable outcome compared to other options where one or both feeds are incinerated.

Process for Pyrolyzing Biosolids and Decomposing Biogas on the Char

Figure 5:
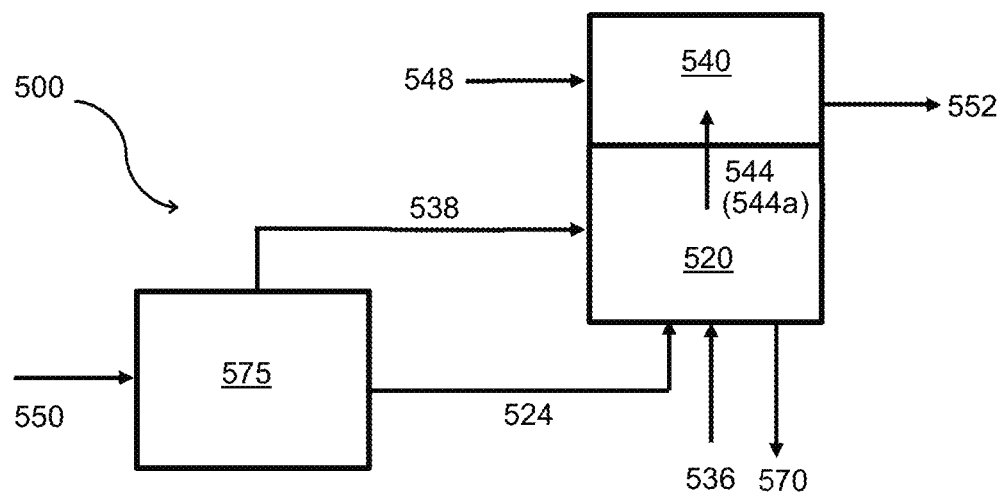
FIG. 5 schematically depicts a process scheme for implementing the system and methods of the invention in a waste water treatment plant.

The methods and systems of the invention may be applied in a waste water treatment plant. Depicted in FIG. 5 is process scheme 500 for such an application. Sewage-derived sludge 550 is fed to and processed in conventional waste water treatment plant 575. The processing produces biosolids stream 524 and methane-rich biogas stream 538. Biosolids stream 524 is pyrolyzed in endothermic reactor 520 in the presence of non-oxidising gas 536 to form hot biochar. The resulting gas mixture 544, comprising the pyrolysis gas and inert gas, is discharged into combustion reactor 540 where it is combusted with air 548. The heat of combustion drives the pyrolysis reaction in reactor 520. Hot flue gas 552 is used to generate electrical power.

The hot char product of the pyrolysis is then sequentially contacted with biogas stream 538, either in reactor 520 as depicted or in a second reactor. The methane in the biogas is catalytically decomposed to form hydrogen and carbon nanomaterial deposits on the char at a decomposition temperature which is higher than the pyrolysis temperature at which the hot char was produced. A portion of the carbon dioxide in the biogas may also be converted to carbon and carbon monoxide. Gas mixture 544a, comprising hydrogen, unreacted biogas 538 and any carbon monoxide, is discharged into combustion reactor 540 where it is combusted with air 548. The heat of combustion drives the decomposition reaction in reactor 520. Inert and stable carbonaceous composite material 570, comprising carbon sequestered from both the biosolids and biogas feedstreams, is produced in the process. Optionally, a portion of the hydrogen in gas mixture 544a (or residual hydrogen in flue gas 552) may be separated and recovered as a product of the process.

It will be understood that the system 500 process equipment for pyrolysis, combustion and carbon decomposition may be according to any of the embodiments disclosed herein, for example as described with reference to FIGS. 1, 2, 3 and 3A, and 4 and 4A.

Process for Pyrolyzing Biosolids and Decomposing Waste Plastic Pyrolysis Gas on the Char In another application, the methods and systems of the invention are used to process municipal waste or polymer (plastic) waste. In some embodiments, a non-recyclable waste plastic fraction is pyrolyzed to produce a hydrocarbon-rich organic gas stream (a plastic pyrolysis gas). This feed gas may then be catalytically decomposed on (bio)char produced from a biomass or other organic waste stream, with residual condensable pyrolysis gas optionally being condensed and recovered as pyrolysis oil.

Figure 6:
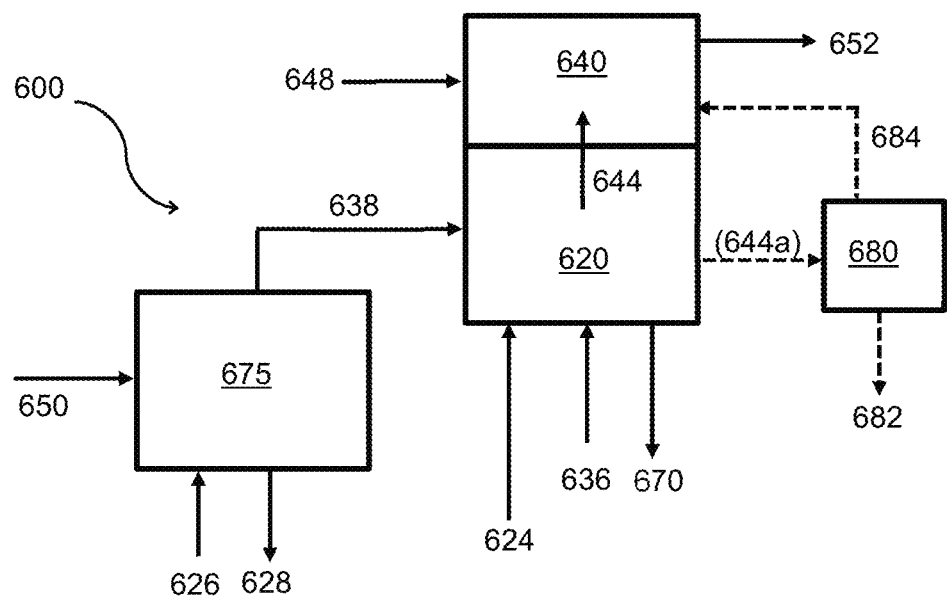
FIG. 6 schematically depicts a process scheme for implementing the system and methods of the invention in combination with a plastic waste pyrolysis process.

Depicted in FIG. 6 is process scheme 600 for such an application. Biomass stream 624, for example a municipal waste biomass, is pyrolyzed in endothermic reactor 620 in the presence of non-oxidising gas 636 to form hot biochar. The resulting gas mixture 644, comprising the pyrolysis gas and inert gas, is discharged into combustion reactor 640 where it is combusted with air 648. The heat of combustion drives the pyrolysis reaction in reactor 620. Hot flue gas 652 may be used to generate electrical power.

Waste polymer 650, for example non-recyclable plastic municipal waste, is separately fed to plastic pyrolysis unit 675 of conventional design, where it is subjected to pyrolysis in the presence of inert gas 626 at a suitable pyrolysis temperature, for example 400 to 600° C. Solid pyrolysis residue 628 is discharged after a suitable residence time. Hot plastic pyrolysis gas 638, including both condensable and non-condensable vapour components, is then fed for contact with hot pyrolysis char sequentially following its production by pyrolysis of biomass stream 624, either in reactor 620 where it was produced (as depicted) or in a second reactor. Methane and/or other hydrocarbon components in pyrolysis gas 638 are catalytically decomposed to form hydrogen and carbon nanomaterial deposits on the char at a decomposition temperature which is higher than the pyrolysis temperature at which the hot char was produced.

After a suitable residence time for conversion over the hot char, gas mixture 644a comprising hydrogen and residual pyrolysis gas 638 is discharged to condenser 680 where pyrolysis oil 682 is condensed and discharged. Pyrolysis oil 682 may advantageously have a low polycyclic aromatic hydrocarbon (PAH) content, in particular a lower PAH content than if gas 638 were condensed without contacting the char. It has been found by experiment that polycyclic aromatic hydrocarbons (PAHs) or precursors thereof present in plastic pyrolysis gas may be catalytically converted on hot pyrolysis char, thereby reducing the presence of PAH components in the condensed pyrolysis oil. Optionally, a portion of the hydrogen may also be separated and recovered as a product of the process. Non-condensable gas fraction 684 may be sent to combustion reactor 640 where it is combusted with air 648. The heat of combustion drives the decomposition reaction in reactor 620. Inert and stable carbonaceous composite material 670, comprising carbon sequestered from both the biomass and plastic pyrolysis gas feedstreams, is thus produced in the process.

EXAMPLES

The present invention is described with reference to the following examples. It is to be understood that the examples are illustrative of and not limiting to the invention described herein.

Example 1. Thermodynamic Calculations

Thermodynamic calculations of the methane decomposition reaction were performed to determine the effect of temperature and to allow comparison of equilibrium and experimental values. The thermodynamic calculations were performed in Aspen Plus software using a Gibbs reactor operation. To understand the relationship between the equilibrium flow rates of mixtures and products, a temperature range from 300 to 1000° C. at atmospheric pressure was selected. A total flow rate of 100 kmol $h^{-1}$ was used as inlet flow rate in the Gibbs reactor and outlet equilibrium flow rates were calculated by minimization of the Gibbs free energy of the reactor under isothermal conditions. The gas was composed of a mixture of $CH_4$ and $N_2$ (10 wt %, 50 wt % and 90 wt % methane with balance of nitrogen).

Figure 8:
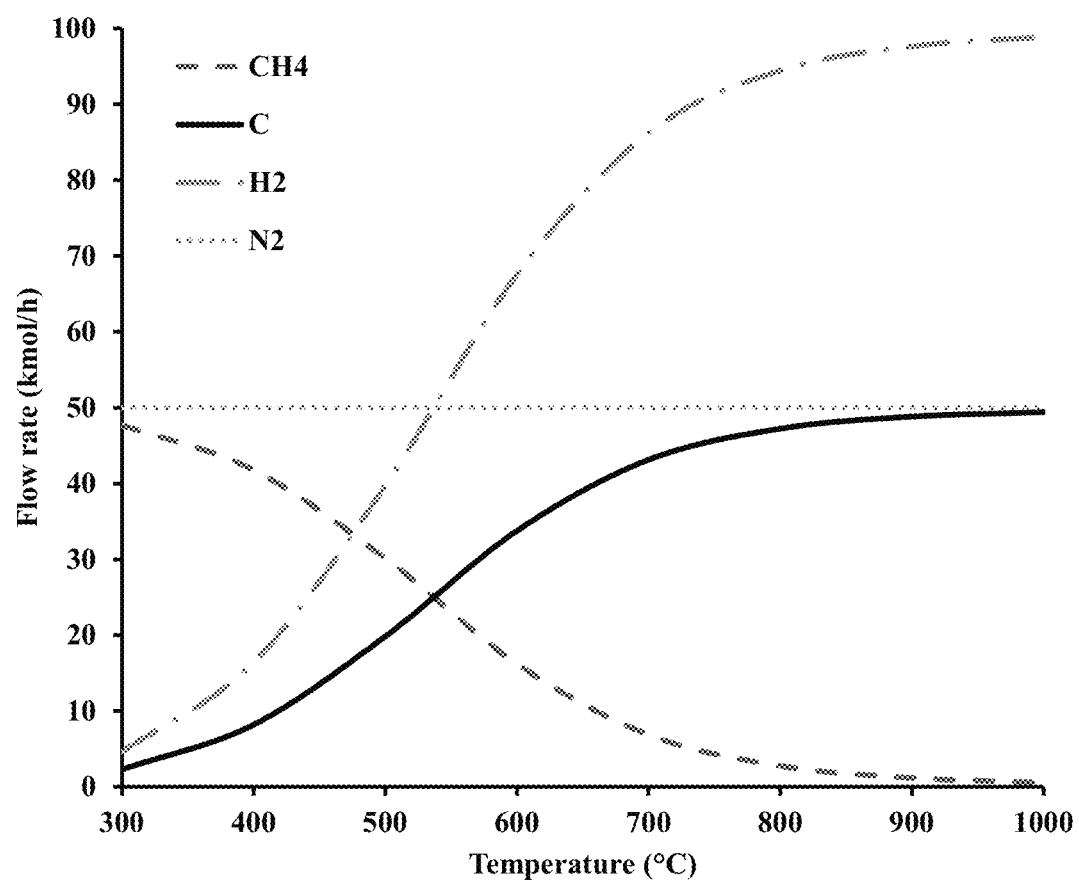
FIG. 8 is a graph plotting the simulated effect of temperature on equilibrium composition in a decomposition reactor when feeding gas composed of 1:1 $CH_4:N_2$.

FIG. 8 shows the effect of the temperature on equilibrium for the gas composed of 1:1 $CH_4$ and $N_2$ (i.e. 50 wt % $CH_4$). At temperatures below 300° C., the equilibrium $CH_4$ flow rate is similar to the inlet $CH_4$ flow rate (100 kmol $h^{-1}$) because methane decomposition reaction is very endothermic and requires relatively high temperatures. $CH_4$ product flow decreases rapidly above 300° C. and exceeds 90% conversion only above 700° C., with consequent $H_2$ and carbon product flow increases. As expected, $N_2$ remains constant due to its inert character.

Example 2. Preparation of Biochar

Biosolids were sourced from a waste water treatment plant. The proximate and ultimate analyses of the biosolids is shown in Table 1, and the chemical composition in Table 2.

TABLE 1

| Proximate analysis (%) [a] | | | | Ultimate analysis (%) [a] | | | | |
|---|---|---|---|---|---|---|---|---|
| Moisture | Volatiles | Ash | Fixed carbon | C | H | N | S | O [b] |
| 13.3 | 50.3 | 27.3 | 9.1 | 30.9 | 4.24 | 4.62 | 1.32 | 30.88 |

[a] Values on dry weight basis.
[b] Values on dry ash free basis

TABLE 2

| Chemical composition (mg/kg) | | | | | | | | | | | | | | |
|---|---|---|---|---|---|---|---|---|---|---|---|---|---|---|
| As | Cd | Cr | Cu | Hg | Mo | Ni | Pb | Se | V | Zn | P | Ca | K | Mg |
| 5 | 1.7 | 22 | 490 | 1 | 6 | 24 | 22 | 5 | 10 | 970 | 24000 | 24000 | 2000 | 4800 |

Biochar was produced by pyrolysis of the biosolids using a vertical fluidised bed quartz reactor with an internal diameter of 27 mm and height in the reaction zone of 680 mm. The distributor plate was placed at 320 mm distance from the bottom to ensure that the gas was preheated before entering the reaction zone. An electric furnace was used for heating the fluidised bed. In each experiment the reactor was charged with 40 g of biosolids, and nitrogen was purged through the fluidised bed reactor at 1000 ml/min flow rate to ensure an inert atmosphere before heating. Pyrolysis runs were conducted using a heating rate of 35° C./min to provide slow pyrolysis conditions, with an isothermal hold condition at a final temperature of 700° C. for 60 min. A stream of nitrogen providing a superficial velocity 3.69 times of the minimum fluidisation velocity was fed during the heating to yield a bubbling fluidisation regime.

Example 3. Preparation of Activated Biochar

Activated char was prepared from the biochar produced in Example 2 by NaOH chemical activation. An amount of 3 g of biochar was initially mixed with 40 mL of 4 M of NaOH, and the mixture was shaken intermittently at room temperature for 2 hours to impregnate the NaOH. Excess solution was removed by vacuum filtration and the treated biochar was dried overnight in an oven at 105° C. The biochar sample was then heated in the quartz tube furnace at a heating rate of 4° C./min under inert conditions (300 mL/min $N_2$ flow) from room temperature to 800° C., and held for 1 hour at 800° C. The furnace was then turned off and the sample was cooled down under a $N_2$ flow of 100 mL/min. The sample was then treated with 2 L of deionized (DI) water followed by 200 mL 0.1 M HCl (200 mL) solution. A final washing step with DI water was performed until the filtrate pH was found to be 7.0. The washed sample was dried in a 105° C. in oven overnight before use.

Example 4. Characterisation of Biochars

The biochar and activated biochar of Examples 2 and 3 were characterised by Fourier-Transform Infrared (FT-IR spectroscopy) and scanning electron microscopy (SEM) using a FEI Verios 460L instrument. BET surface area and pore structure properties were determined by a Micromeritics physical adsorption apparatus using $N_2$ adsorption at 77 K.

The FT-IR results indicated that the biochar produced in Example 2 had significantly higher amounts of surface oxygen species compared with the activated biochar produced in Example 3. This was evident by comparison of the FT-IR bands at about 1002 $cm^{-1}$ which are attributed to carboxylic acid stretching modes.

The SEM results qualitatively indicated that the activated char had a highly porous activated structure (i.e. large number of smaller pores) compared to the non-activated char. This was consistent with BET results shown in Table 3, which indicate that the surface area of the activated char is nearly double the non-activated char. The pore diameter of activated char was also found to be much lower, and close to the reported mean diameter of the methane molecule (i.e. 0.38 nm).

TABLE 3

| Sample | Biochar (Example 2) | Activated char (Example 3) |
|---|---|---|
| Total surface area ($m^2$/g) | 90.97 ± 5.82 | 180.54 ± 11.19 |
| Micropore volume ($cm^3$/g) | 0.028 ± 0.002 | 0.018 ± 0.001 |
| Pore diameter (nm) | 1.3 ± 0.083 | 0.38 ± 0.024 |

Example 5. Catalytic Methane Decomposition Reactions

Catalytic methane decomposition (CMD) experiments were performed in a fixed bed reactor, with 27 mm internal diameter and 650 mm length, heated by a three-zone electric furnace. In each test, 1 g of the fresh catalyst (biochar or activated biochar as produced in Examples 2 and 3) was loaded in the reactor and a flow rate of 100 ml/min of 10, 50 and 90 wt % $CH_4$ in $N_2$ was passed through the reactor at a weight hourly space velocity (WHSV) of 6 $Lg^{-1}$ $h^{-1}$. Reactions were operated under isothermal conditions at different temperatures (700° C. and 900° C.) for 6 hours (initial heating rate of 35° C./min). The post-reaction gases were collected in tedlar bags at every 5 min for first 30 min, and thereafter every 30 minutes. The gases were analysed using a gas chromatograph.

In a blank experiment without carbon catalyst the conversion of methane at both 700° C. and 900° C. was found to be negligible, indicating that the uncatalyzed reaction rate is extremely low under the reaction conditions.

In the catalyzed reactions, the GC analysis showed no $CO_2$ signals in all cases, suggesting that methane undergoes one step decomposition to produce $CO_2$-free $H_2$ and carbon. Trace CO signals were obtained in some cases which may result from the reactions of oxygen-containing functional groups in the biochar. The methane conversion was calculated by the area under the curve of the methane peak area and the hydrogen yield (% $H_2$) could be calculated using Eq. 1 because other product gases were negligible.

$$\% \ H_2 = \frac{200 X_{CH4}}{1 + X_{CH4}} \quad (1)$$

Figure 9:
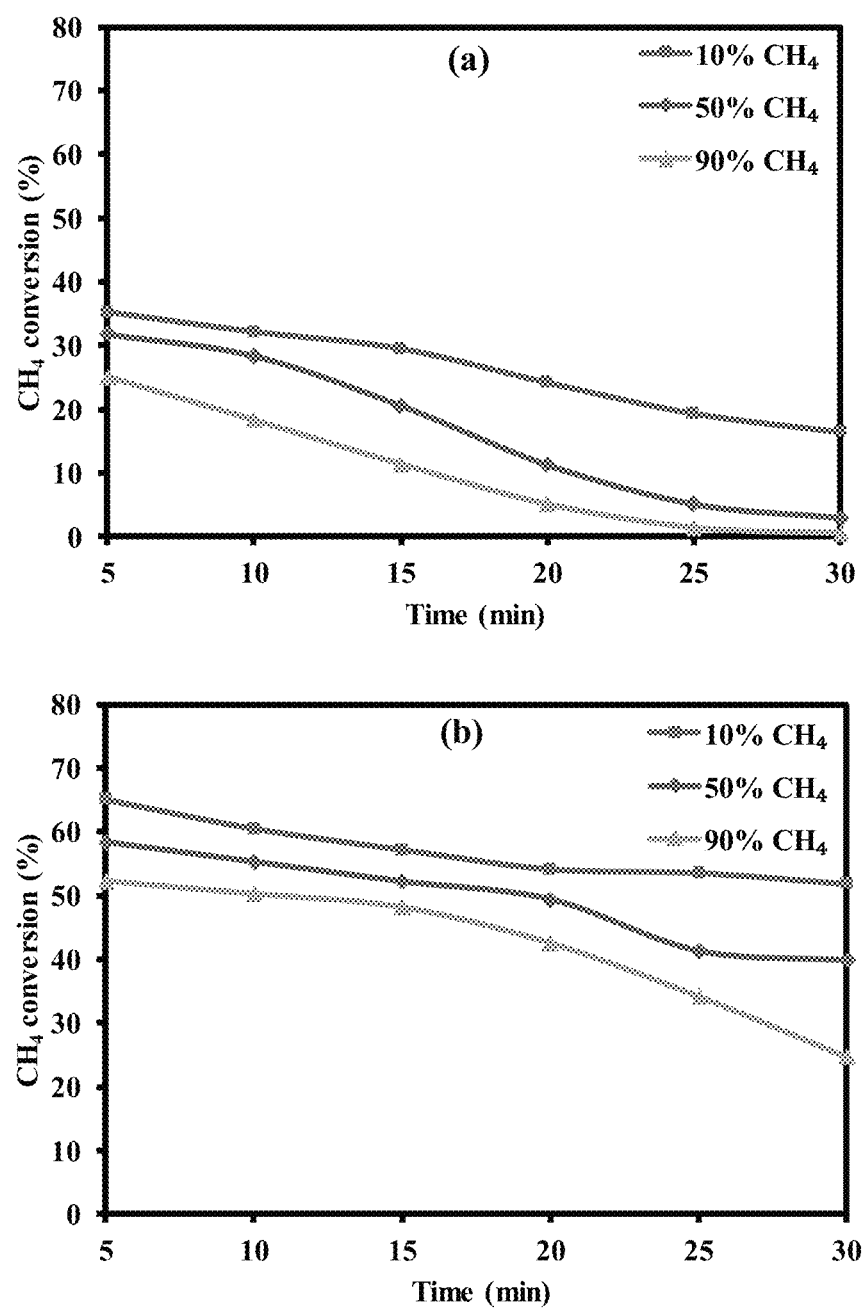
FIG. 9 is a graph plotting the methane conversions for biochar catalysts produced in Example 2 during the first 30 minutes of catalytic methane decomposition at (a) 700° C. and (b) 900° C. for feeds of 10 wt %, 50 wt % and 90 wt % $CH_4$ in $N_2$.

FIG. 9 shows the methane conversions for biochar catalysts produced in Example 2 during the first 30 minutes of CMD at (a) 700° C. and (b) 900° C. for feeds of 10 wt %, 50 wt % and 90 wt % $CH_4$ in $N_2$. High initial methane conversion was observed with a rapid decline during the first 30 minutes. Higher conversion values were observed for lower concentration of methane (i.e. 10% $CH_4$ in $N_2$). Substantially higher conversions were obtained at 900° C. compared to 700° C.

Figure 10:
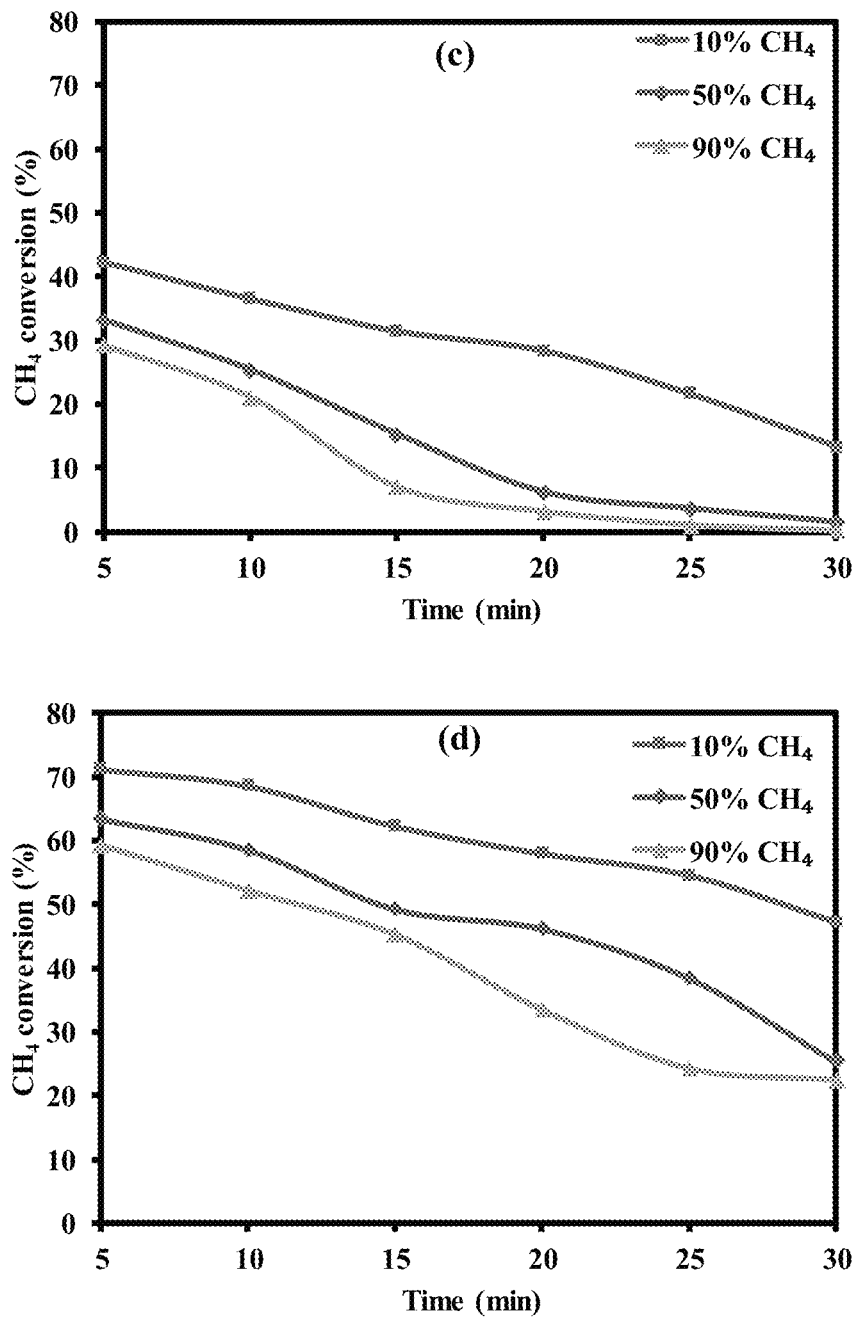
FIG. 10 is a graph plotting the methane conversions for activated biochar catalysts produced in Example 3 during the first 30 minutes of catalytic methane decomposition at (a) 700° C. and (b) 900° C. for feeds of 10 wt %, 50 wt % and 90 wt % $CH_4$ in $N_2$.

FIG. 10 shows the equivalent results for activated biochar catalysts produced in Example 3 at (c) 700° C. and (d) 900° C. The activated char gave somewhat higher initial methane conversion values than non-activated biochar, but a greater rate of deactivation.

Figure 11:
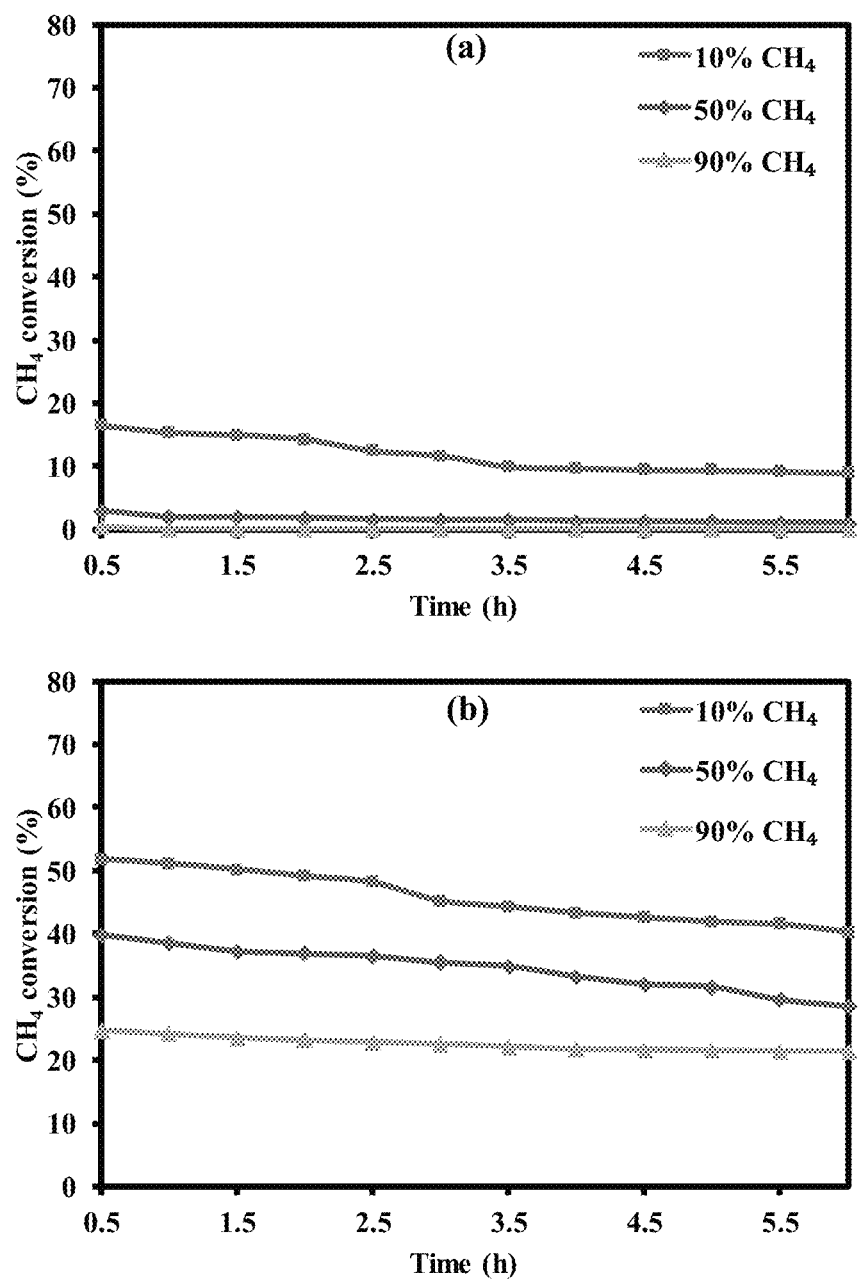
FIG. 11 is a graph plotting the methane conversions for biochar catalysts produced in Example 2 during the period between 30 and 6 hours of catalytic methane decomposition at (a) 700° C. and (b) 900° C. for feeds of 10 wt %, 50 wt % and 90 wt % $CH_4$ in $N_2$.

FIG. 11 shows the continuation of the results depicted in FIG. 9 (for non-activated biochar produced in Example 2) over the full 6-hour reaction at (a) 700° C. and (b) 900° C. The rates of deactivation were significantly lower after the first 30 minutes. The longer-term methane conversion activity of the biochar was superior to that of the activated biochar (results not shown).

The experimentally obtained conversions were much lower than the results predicted at equilibrium from the thermodynamic calculations in Example 1. This is consistent with the hypothesis that methane cracking over the char is a surface reaction and becomes more dependent on the diffusion of methane from the gas phase to the catalytic char surface as the methane concentration increases.

At the end of the reactions, the carbonaceous product material was recovered, and the total amount of carbon deposits calculated by comparing the initial and final masses. The results are shown in in Table 4 below. Higher amounts of carbon deposits were produced on the surface of the biochar and activated char at higher temperatures. At constant temperature, the carbon deposits increased with an increase in methane partial pressure (i.e. concentration). The non-activated biochar produced slightly higher overall carbon deposition compared with activated char at all studied temperatures and methane concentrations, due to the lower rate of deactivation.

TABLE 4

| Temperature (° C.) | Carbon catalyst | Amount of carbon deposited ($C_{dep}/C_{catalyst}$) ($g_c g_{cat}^{-1}$) | | |
|---|---|---|---|---|
| | | Feed gas: $CH_4:N_2 = 1:9$ | Feed gas: $CH_4:N_2 = 1:1$ | Feed gas: $CH_4:N_2 = 9:1$ |
| 700 | Biochar | 0.072 ± 0.005 | 0.081 ± 0.006 | 0.089 ± 0.006 |
| | Activated char | 0.061 ± 0.004 | 0.073 ± 0.005 | 0.075 ± 0.005 |
| 900 | Biochar | 0.215 ± 0.015 | 0.238 ± 0.017 | 0.254 ± 0.017 |
| | Activated char | 0.136 ± 0.009 | 0.152 ± 0.010 | 0.164 ± 0.011 |

Example 6. Characterisation of Composite Biochars with CMD Carbon Deposits

The carbonaceous product materials of the CMD reactions in Example 5 were characterised by BET measurements, SEM and transmission electron microscopy (TEM) using a JEOL-1010 microscope. For the TEM analysis, the samples were firstly finely ground, dispersed in isopropyl alcohol (IPA) and a drop of solution was then deposited on a classical TEM carbon grid.

The BET results are shown in Table 5. The surface areas of all materials were substantially reduced compared with the starting chars (as reported in Example 4), consistent with the formation of carbon deposits on the char surface.

TABLE 5

| Sample | Methane concentration in feed (wt %) | Total surface area ($m^2/g$) | |
|---|---|---|---|
| | | 700° C. | 900° C. |
| Biochar | 10 | 7.35 ± 0.36 | 7.06 ± 0.37 |
| | 50 | 6.44 ± 0.26 | 4.57 ± 0.22 |
| | 90 | 6.18 ± 0.27 | 4.42 ± 0.21 |

TABLE 5-continued

| Sample | Methane concentration in feed (wt %) | Total surface area ($m^2/g$) | |
|---|---|---|---|
| | | 700° C. | 900° C. |
| Activated char | 10 | 10.72 ± 0.50 | 6.87 ± 0.35 |
| | 50 | 9.56 ± 0.48 | 5.32 ± 0.27 |
| | 90 | 9.18 ± 0.47 | 3.93 ± 0.18 |

The SEM and TEM analyses revealed the formation of crystalline carbon nanomaterials. At 700° C., short length carbon nanofibres (CNFs) aggregates with diameter of 10-100 nm were found to be deposited on both the biochar and activated char surfaces. The CNFs were found to be highly curved and randomly tangled into each other. At 900° C., carbon nanospheres (CNSs) with uniform diameter of about 40 nm were found to be deposited on both biochar and activated char surfaces. Some CNSs aggregation was noted due to the small diameters.

Example 7. Catalytic Biogas Decomposition Reactions

Catalytic decomposition experiments with synthetic biogas were performed in the fixed bed reactor described in Example 5. 5 g of the fresh catalyst (biochar as produced in Example 2) was loaded in the reactor and a flow rate of 100 ml/min of a gas mixture comprising 60 wt. % $CH_4$ and 40 wt. % $CO_2$ was passed through the reactor at a weight hourly space velocity (WHSV) of 1.2 $Lg^{-1} h^{-1}$. Reactions were operated under isothermal conditions at 900° C. for 6 hours (initial heating rate of 35° C./min). The post-reaction gases were collected in tedlar bags at every 5 min for first 30 min, and thereafter every 30 minutes. The gases were analysed using a gas chromatograph.

Methane conversions of 60-70% were initially obtained, dropping to 40-45% conversion after 6 hours. Hydrogen ($H_2$) was detected in the gas product. Excellent $CO_2$ conversions were also obtained under the reductive conditions of the decomposition process, with 90-95% conversion obtained initially, dropping to 65-70% conversion after 6 hours. The expected reduction product carbon monoxide (CO) was detected together with $H_2$ in the gas product. Analysis of the composite carbonaceous product by SEM and TEM again showed the formation of carbon nanospheres.

Example 8. Catalytic Pyrolysis Gas Decomposition Reactions

A reactor was charged with particulate polypropylene (0-600 micron particle size). The reactor was purged with nitrogen, the nitrogen flow rate was set to 100 ml/min and then heated to a temperature of 500° C. with an initial heating rate of 35° C./min. The polypropylene was thus pyrolyzed to form vaporised hydrocarbon species, predominantly linear $C_1$ to $C_{10}$ molecules.

The fixed bed reactor described in Example 5 was again charged with 1 g of fresh biochar catalyst (as produced in Example 2). The hydrocarbon rich gas stream containing polypropylene pyrolysis products was then passed over the char under isothermal conditions at different temperatures (700° and 900° C.) for 6 hours (initial heating rate of 35° C./min).

At the end of the reactions, the carbonaceous product material was recovered. The products consisted of carbon nanomaterial deposits on the char, including both carbon nanofibers and carbon nanospheres.

Example 9. Catalytic Pyrolysis Gas Decomposition Reactions

The decomposition of plastic pyrolysis gas on biochar was investigated in greater detail in this Example. The biochar catalyst was pre-produced by pyrolysis of woody biomass (sawdust) at 700° C. in a muffle furnace. The biochar thus produced was sieved to produce a fraction with particle sizes in the range of 1-100 microns (excluding a nano-sized and a 100-300 micron fraction).

A quartz tube reactor (internal diameter 27 mm; length 1000 mm) was placed in an electrically heated furnace with three independently heated zones. Waste polypropylene copolymer (PPC) was washed, air-dried and shredded into small pieces, and 10 g of the PPC was placed in the second (middle) reaction zone. 10 g of the biochar was placed in the third reaction zone of the quartz tube reactor. The first zone remained empty, and was used for pre-heating the $N_2$ gas flow through the reactor.

Sequential pyrolysis and carbon deposition reactions were then conducted by flowing $N_2$ (100 mL/min) through the quartz reactor (in the order: zone 1-zone 2-zone 3) and heating the reaction zones independently. The temperature of PPC pyrolysis in zone 2 and hydrocarbon vapour decomposition in zone 3 were controlled using two different electrical controllers, with an initial ramp rate of 35° C./min used for both zones to reach the target hold temperature. In all experiments, the PPC pyrolysis was conducted at a hold temperature of 500° C., while the effect of hydrocarbon vapour decomposition temperature was investigated at hold temperatures in the range of 500° C. to 900° C.

During the reactions, condensable products were recovered downstream of the reactor in a condenser, and non-condensable gases were analysed using an online micro-GC analyser. After the reaction, the carbon material in zone 3 was recovered after cooling to room temperature under continuing flow of $N_2$. The condensed products were analysed by GC-MS. The results are shown in Table 6.

The pyrolysis of PPC at 500° C., in the absence of a downstream vapour decomposition catalyst, produced a product slate comprising non-condensable gases and condensable liquid products in a ratio of about 3:1 (w/w). In experiments where the PPC pyrolysis vapours were passed over the biochar, it is evident that reaction of the pyrolysis vapours on the biochar catalyst was negligible at 500° C., and slow at 700° C. At 900° C., a shift to gaseous products was evident and significant amounts of solid carbon was deposited on the biochar.

Analysis of the product gases indicated the formation of $H_2$ at 700° C. and 900° C. biochar temperatures, but not at 500° C. or in the absence of a biochar catalyst. Other gas products included methane (increasing amounts at higher biochar temperatures), ethane, ethylene, propane, propylene and isobutylene.

Figure 12:
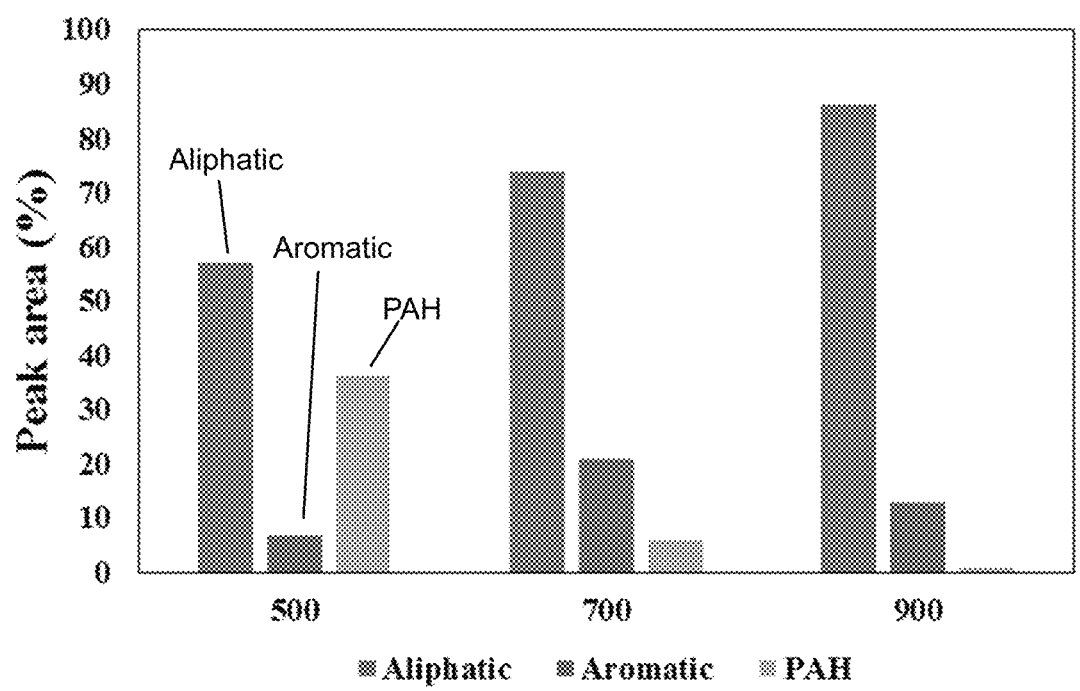
FIG. 12 is a graph plotting the amount of aliphatic, aromatic and polycyclic aromatic hydrocarbons (PAH) fraction in condensed pyrolysis oil after contact of the polymer pyrolysis vapour with hot biochar at 500, 700 and 900° C. in Example 9.

The condensed liquid products were classified by GC-MS analysis into three components: aliphatics, aromatics and polycyclic aromatic hydrocarbons (PAH). The aliphatics included alkanes and alkenes, the aromatics mainly consisted of benzene and its derivatives and o-xylene, and the PAHs included perylene, naphthalene, indene, and their derivatives. The composition of the liquids fraction produced in the experiments is shown in FIG. 12 (where the composition at 500° C. is almost identical to the composition obtained in the absence of a biochar catalyst). In addition to carbon formation, the biochar catalyst also significantly suppressed the formation of PAH components in the liquid product (from 36% to 1% at 900° C.). PAH compounds are undesirable components of pyrolysis oils, and the process of the invention thus advantageously provides a means to reduce their presence in the liquid product of a pyrolytic process, e.g. for beneficiating polymer waste.

Figure 13:
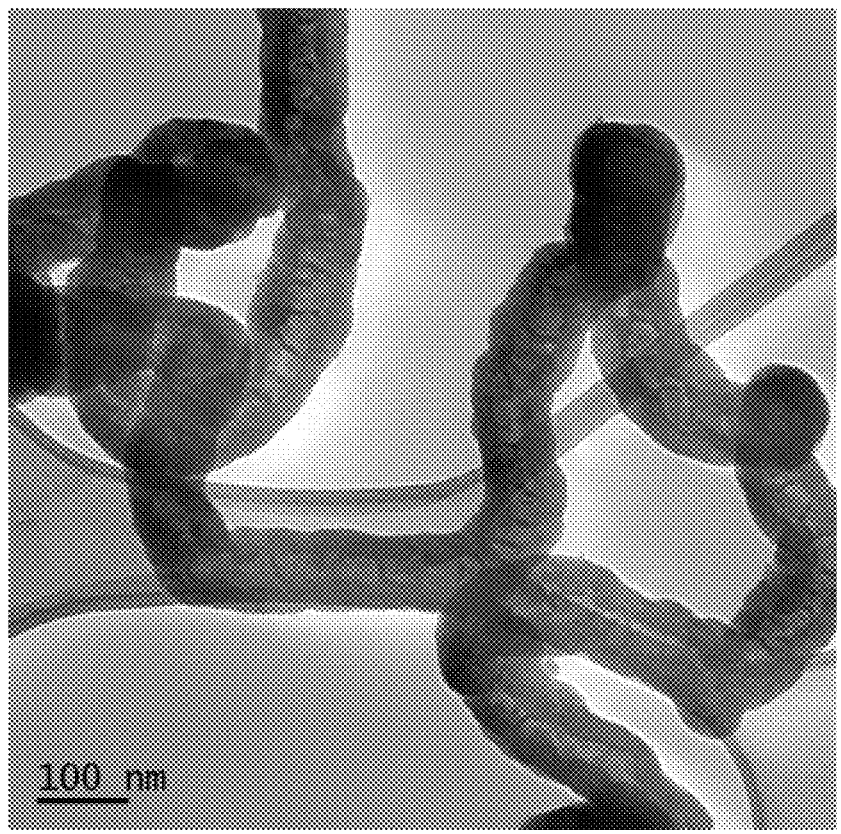
FIG. 13 shows a transmission electron microscopy image of a carbon nanotube produced by decomposition of polymer pyrolysis vapour on hot biochar at 900° C. in Example 9.

The solid products in zone 3 of the reactor were recovered and analysed by SEM and TEM. Filamental carbon nanomaterials with a uniform distribution were formed at 700° C. and 900° C. FIG. 13 depicts a TEM micrograph showing a carbon nanotube formed at 900° C. with few defects and a smooth surface.

Example 10. Use of Carbon Composite Biochars with CMD Carbon Deposits as Absorbents The use of biochar and carbon composite biochars with carbon deposits as absorbents for per- and polyfluoroalkyl substances (PFAS) was investigated, with comparison against commercial activated carbon. In each experiment, 1 g of the absorbent was contacted with 50 ml of water contaminated with PFAS compounds for 48 hours. The PFAS components were perfluorohexane sulfonic acid (PFHXs), perfluorooctane sulfonic acid (PFOS), and perfluorooctanoic acid (PFOA). The results of the tests are shown in Table 6. It is evident that the carbon composite materials provide improved absorption of PFAS compounds compared to their biochar precursors and have potential as a replacement for high cost absorbents used commercially in this application.

TABLE 6

| Biochar Catalyst (g) | Decomposition temperature (° C.) | Gas yield (%) | Liquid yield (%) | Solid yield (%) | Carbon deposits (g) | Carbon yield % ($g/g_{cat}$) | Overall carbon balance (%) |
|---|---|---|---|---|---|---|---|
| 0 | 500 | 75.15 | 24.85 | — | | | |
| 10 | 500 | 75.15 | 24.83 | 0.01 | 0.001 | 0.02 | 93 |
| 10 | 700 | 77.11 | 22.81 | 0.08 | 0.008 | 0.16 | 92 |
| 10 | 900 | 78.44 | 21.02 | 0.54 | 0.051 | 1.02 | 98 |

TABLE 6

| Sample | PFOS (µg/L) | PFOA (µg/L) | PFHxS (µg/L) | % removal PFOS | PFOA | PFHxS |
|---|---|---|---|---|---|---|
| PFAS-contaminated water | 310 | 25 | 140 | | | |
| Biochar (example 2) | 38 | 9.7 | 50 | 88 | 61 | 72 |
| Biochar with carbon deposits (900° C., example 5) | 17 | 7.3 | 30 | 95 | 71 | 72 |
| Activated carbon (commercial) | 0.52 | 0.07 | 0.18 | 100 | 100 | 100 |

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of sequential pyrolysis and carbon deposition to produce a composite carbonaceous product, the method comprising:
a pyrolysis process step comprising pyrolyzing a pyrolyzable organic feed at a pyrolysis temperature in a first reaction zone in the presence of a non-oxidising gas to produce hot char and pyrolysis gas, wherein the pyrolysis gas and the non-oxidising gas combine to form a gas mixture;
discharging the gas mixture from the first reaction zone to a combustion zone and combusting at least a portion of the pyrolysis gas therein, wherein heat produced by the combusting of the pyrolysis gas is transmitted from the combustion zone to the first reaction zone to provide at least a portion of the heat of pyrolysis; and
a decomposition process step comprising contacting a hydrocarbon-rich organic gas with the hot char directly after its production in the pyrolysis process step, wherein the hydrocarbon-rich organic gas catalytically decomposes on the hot char at a decomposition temperature which is higher than the pyrolysis temperature, thereby producing gaseous decomposition products comprising hydrogen and a composite carbonaceous material comprising the char with carbon deposits thereon,
the carbon deposits comprising carbon nanomaterials,
wherein the hot char remains continuously at temperatures of above 300° C. between its production in the pyrolysis process step and the catalytic decomposing of the hydrocarbon-rich organic gas thereon in the decomposition process step, and
wherein at least 90% of the hydrocarbon-rich organic gas is provided from a source external to the pyrolysis process step where the hot char is produced.

2. A method according to claim 1, further comprising separating a gas composition comprising the gaseous decomposition products and any residual hydrocarbon-rich organic gas from the composite carbonaceous material and combusting at least a portion of the combustible components therein, wherein heat produced by the combusting of the combustible components is transmitted to provide at least a portion of the heat of decomposition.

3. A method according to claim 1, wherein the pyrolyzable organic feed comprises biosolids.

4. A method according to claim 1, wherein the hot char remains continuously at temperatures of above 400° C. between its production in the pyrolysis process step and the catalytic decomposing of the hydrocarbon-rich organic gas thereon in the decomposition process step.

5. A method according to claim 1, wherein the pyrolyzing in the pyrolysis process step and the catalytic decomposing in the decomposition process step are conducted sequentially in the first reaction zone.

6. A method according to claim 5, wherein solids in the first reaction zone are continuously fluidised during the pyrolyzing and the catalytic decomposing in a fluidising stream comprising the non-oxidising gas and/or the hydrocarbon-rich organic gas.

7. A method according to claim 1, wherein the first reaction zone is separated from the combustion zone by a heat-transmissive partition, wherein the heat transmitted from the combustion zone to the first reaction zone to provide at least a portion of the heat of pyrolysis is transmitted through the heat-transmissive partition.

8. A method according to claim 7, wherein the heat-transmissive partition comprises a plurality of apertures, wherein the gas mixture flows from the first reaction zone to the combustion zone via the apertures.

9. A method according to claim 7, wherein the catalytic decomposing in the decomposition process step is conducted in the first reaction zone and wherein a gas composition comprising the gaseous decomposition products and any residual hydrocarbon-rich organic gas is discharged to the combustion zone for combustion of combustible components therein, wherein heat produced by the combusting of the combustible components is transmitted through the heat transmissive partition to provide at least a portion of the heat of decomposition.

10. A method according to claim 1, wherein the hydrocarbon-rich organic gas is selected from methane-rich biogas and a plastic pyrolysis gas.

11. A method according to claim 1, wherein the decomposition temperature is at least 700° C.

12. A method according to claim 1, further comprising introducing an activation additive to the first reaction zone before or during the pyrolyzing, wherein the activation additive causes an increase in a surface area of the hot char relative to hot char produced in the absence of the additive.

13. A method according to claim 1, wherein the composite carbonaceous material comprises at least 5 wt % of the carbon deposits.

14. A method according to claim 1, wherein the carbon nanomaterials comprise at least one selected from carbon nanotubes, carbon nanofibers and carbon nanospheres.

15. A method according to claim 1, further comprising separating a gas composition comprising the gaseous decomposition products and any residual hydrocarbon-rich organic gas from the composite carbonaceous material and separating hydrogen from the gas composition.

16. A method according to claim 1, wherein the hydrocarbon-rich organic gas contacted with the hot char for catalytic decomposition does not contain the pyrolysis gas, or components thereof, produced in the pyrolysis process step.

17. A method according to claim 1, wherein the decomposition temperature is at least 800° C.

18. A method according to claim 1, wherein the hydrocarbon-rich organic gas is a methane-rich gas, and wherein methane in the hydrocarbon-rich organic gas is catalytically decomposed on the hot char by the reaction:

$$CH_4 \rightarrow C + 2H_2.$$

* * * * *